United States Patent
Kamp et al.

(10) Patent No.: US 9,606,921 B2
(45) Date of Patent: Mar. 28, 2017

(54) GRANULAR CREATION AND REFRESH OF COLUMNAR DATA

(71) Applicant: Oracle International Corporation, Redwood Shores, CA (US)

(72) Inventors: Jesse Kamp, Castro Valley, CA (US); Vineet Marwah, San Ramon, CA (US); Amit Ganesh, San Jose, CA (US); Michael Gleeson, Redwood Shores, CA (US); Maheswaran Venkatachalam, Redwood Shores, CA (US); Allison Holloway, San Carlos, CA (US); Niloy Mukherjee, San Jose, CA (US); Sanket Hase, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 427 days.

(21) Appl. No.: 14/337,045

(22) Filed: Jul. 21, 2014

(65) Prior Publication Data

US 2015/0088824 A1   Mar. 26, 2015

Related U.S. Application Data

(60) Provisional application No. 61/880,852, filed on Sep. 21, 2013.

(51) Int. Cl.
*G06F 17/30* (2006.01)
*G06F 12/0815* (2016.01)
(Continued)

(52) U.S. Cl.
CPC .......... *G06F 12/0815* (2013.01); *G06F 3/064* (2013.01); *G06F 3/0604* (2013.01);
(Continued)

(58) Field of Classification Search
CPC ......... G06F 17/30312; G06F 17/30595; G06F 17/30315; G06F 17/30377; G06F 12/0815; G06F 2212/313
See application file for complete search history.

(56) References Cited

U.S. PATENT DOCUMENTS

| | | | |
|---|---|---|---|
| 5,692,174 A | 11/1997 | Bireley | |
| 5,742,792 A | 4/1998 | Yanai et al. | |

(Continued)

FOREIGN PATENT DOCUMENTS

| | | | |
|---|---|---|---|
| EP | 2 608 070 A1 | 6/2013 | |
| WO | WO 2007/078444 A1 | 7/2007 | |

OTHER PUBLICATIONS

Meikel Poess and Dmitry Potapov, "Data Compression in Oracle", Proceedings of the 29th VLDB Conference, Berlin, Germany, Sep. 9-12, 2003, pp. 1-11.*

(Continued)

*Primary Examiner* — Cheryl Lewis
(74) *Attorney, Agent, or Firm* — Hickman Palermo Becker Bingham LLP

(57) ABSTRACT

Techniques are provided for granular load and refresh of columnar data. In an embodiment, a particular data object that contains particular data formatted different from column-major format is maintained, the particular data including first data and second data. First and second data objects contain the first and second data, respectively, organized in the column-major format. In response to changes being committed to the first data in the particular data object, invalidating one or more rows of the first data object. In response to a number of invalidated rows of the first data object exceeding a threshold, automatically performing a refresh operation on the first data object independent of any refresh operation on the second data object.

26 Claims, 15 Drawing Sheets

(51) Int. Cl.
*G06F 15/78* (2006.01)
*G06F 12/1018* (2016.01)
*G06F 3/06* (2006.01)

(52) U.S. Cl.
CPC ............ *G06F 3/065* (2013.01); *G06F 3/0689* (2013.01); *G06F 12/1018* (2013.01); *G06F 15/78* (2013.01); *G06F 17/30312* (2013.01); *G06F 17/30315* (2013.01); *G06F 17/30377* (2013.01); *G06F 17/30477* (2013.01); *G06F 17/30595* (2013.01); *G06F 2003/0697* (2013.01); *G06F 2212/1021* (2013.01); *G06F 2212/1032* (2013.01); *G06F 2212/2542* (2013.01); *G06F 2212/313* (2013.01)

(56) References Cited

U.S. PATENT DOCUMENTS

| | | | |
|---|---|---|---|
| 5,778,430 | A | 7/1998 | Ish et al. |
| 6,009,432 | A | 12/1999 | Tarin |
| 7,149,769 | B2 | 12/2006 | Lubbers et al. |
| 8,433,684 | B2 | 4/2013 | Ruiz Munoz |
| 8,856,484 | B2 | 10/2014 | Ben-Tsion et al. |
| 9,355,146 | B2* | 5/2016 | Arndt ................ G06F 17/30466 |
| 2003/0229640 | A1 | 12/2003 | Carlson |
| 2004/0098372 | A1 | 5/2004 | Bayliss |
| 2005/0033818 | A1 | 2/2005 | Jardin |
| 2005/0055380 | A1 | 3/2005 | Thompson et al. |
| 2005/0131893 | A1 | 6/2005 | Von Glan |
| 2005/0187977 | A1 | 8/2005 | Frost |
| 2008/0059492 | A1 | 3/2008 | Tarin |
| 2008/0065591 | A1 | 3/2008 | Guzenda |
| 2008/0256250 | A1 | 10/2008 | Wakefield |
| 2008/0281784 | A1 | 11/2008 | Zane et al. |
| 2008/0281865 | A1 | 11/2008 | Price et al. |
| 2009/0043910 | A1 | 2/2009 | Barsness |
| 2009/0307290 | A1 | 12/2009 | Barsness et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0138123 | A1 | 6/2011 | Gurajada et al. |
| 2012/0173515 | A1 | 7/2012 | Jeong et al. |
| 2012/0323971 | A1 | 12/2012 | Pasupuleti |
| 2013/0151567 | A1 | 6/2013 | Ellison |
| 2013/0275364 | A1 | 10/2013 | Wang |
| 2014/0040218 | A1 | 2/2014 | Kimura et al. |
| 2014/0075493 | A1 | 3/2014 | Krishnan et al. |
| 2014/0114952 | A1 | 4/2014 | Robinson |
| 2015/0088811 | A1 | 3/2015 | Hase et al. |
| 2015/0088822 | A1 | 3/2015 | Raja et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2016/0210330 | A1* | 7/2016 | Arndt ................ G06F 17/30466 |

OTHER PUBLICATIONS

U.S. Appl. No. 14/337,182, filed Jul. 21, 2014, Final Office Action, Jul. 17, 2015.
U.S. Appl. No. 14/337,179, filed 074/21/2014, Notice of Allowance, Jul. 29, 2015.
U.S. Appl. No. 14/337,183, filed Jul. 21, 2014, Notice of Allowance, Apr. 24, 2015.
U.S. Appl. No. 14/337,179, filed Jul. 21, 2014, Notice of Allowance, Nov. 3, 2015.
U.S. Appl. No. 14/337,142, filed Jul. 21, 2014, Notice of Allowance, Apr. 27, 2016.
Schaffner et al., "A Hybrid Row-Column OLTP Database Architecture for Operational Reporting ", Business Intelligence for the real-time Enterprise, dated Aug. 24, 2008, 14 pages.
Ramamurthy, Ravishankar, "A Case for Fractured Mirrors" Proceedings of the 28th VLDB Conference, dated, 2002, 12 pages.
Nirmesh, Malviya, "Recovery Algorithms for In-Memory OLTP Databases", Master of Science Thesis, dated Jul. 1, 2012, 66 pages.
Farber et al., "SAP HANA Database—Data Management for Modern Business Applications", SIGMOD Record, dated Dec. 2011, vol. 40, No. 4, 8 pages.
U.S. Appl. No. 14/337,183, filed Jul. 21, 2014, Office Action, Jan. 13, 2015.
U.S. Appl. No. 14/337,182, filed Jul. 21, 2014, Office Action, Jan. 26, 2015.
U.S. Appl. No. 14/337,179, filed Jul. 21, 2014, Office Action, Dec. 29, 2014.
U.S. Appl. No. 14/337,164, filed Jul. 21, 2014, Notice of Allowance, Feb. 22, 2016.
U.S. Appl. No. 14/337,182, filed Jul. 21, 2014, Interview Summary, May 8, 2015.

* cited by examiner

TABLE 200

|  | C1 | C2 | C3 |
|---|---|---|---|
| R1 | R1C1 | R1C2 | R1C3 |
| R2 | R2C1 | R2C2 | R2C3 |
| R3 | R3C1 | R3C2 | R3C3 |
| R4 | R4C1 | R4C2 | R4C3 |
| R5 | R5C1 | R5C2 | R5C3 |
| R6 | R6C1 | R6C2 | R6C3 |

GRANULAR CREATION AND REFRESH OF COLUMNAR DATA

CROSS-REFERENCE TO RELATED APPLICATIONS

This application claims priority to U.S. Provisional Patent Application No. 61/880,852 filed Sep. 21, 2013, the content of which is hereby incorporated by reference in its entirety herein.

FIELD OF THE DISCLOSURE

The present disclosure relates to database systems and, more specifically, to creation and management of database objects that reside in memory in one format and on disk in another format.

BACKGROUND

Given that main memory is becoming cheaper and larger, new data formats are needed to speed query processing when data is stored in memory. Existing formats are designed for disk and, when stored in memory (e.g. in the buffer cache), the formats are not optimal for queries. For example, it is common for database systems to store data persistently in "disk blocks". Typically, within each disk block, data is arranged in row-major format. That is, the values of all columns of one row are followed by the values of all columns for the next row.

To speed up performance, some of the disk blocks may be cached in a "buffer cache" within volatile memory. Accessing the data from volatile memory is significantly faster than accessing the data from disk. However, even within the volatile memory, the data is still in the format of row-major disk blocks, which is not optimal for certain types of database operations.

In contrast to row-major disk blocks, columnar formats have many attractive advantages for query processing in memory, such as cache locality and compression. Consequently, some database servers now employ new table types for persistently storing data in column-major formats. In column-major format, the data may be read into volatile memory where it can be used to process certain queries more efficiently than would be possible if the data were stored in row-major disk blocks.

Unfortunately, the task of migrating existing databases that persistently store data in row-major disk blocks to use of the new column-major table types is not trivial. Further, after performing such a migration, query processing will be less efficient for the class of queries that can be performed more efficiently on data that is stored in row-major disk blocks.

As an alternative, some database systems keep the data in row-major disk blocks, but employ column store indexes. Column store indexes do not replace existing tables, and therefore do not require the entire database to be migrated to new table structures. Rather, column store indexes act more as a traditional secondary index. For example, such column store indexes are still persisted to disk. Unfortunately, a significant amount of overhead may be required to maintain such indexes as updates are performed on the data indexed thereby.

As yet another alternative, one may replicate a database, where a first replica of the database stores the data in conventional row-major disk blocks, while a second replica stores the data in a column-major format. When a database is replicated in this manner, queries that are most efficiently processed using row-major data may be routed to the first replica, and queries that are most efficiently processed using column-major data may be routed to the second replica.

Unfortunately, this technique does not work well due to the lag that occurs between replicated systems. Specifically, at any given point in time, some changes made at one of the replicas will not yet have been applied to the other replica. Consequently, the lag inherent in the replication mechanism may result in unpredictable artifacts and, possibly, incorrect results.

Further, each transaction generally needs to see its own changes, even before those changes have been committed. However, database changes are not typically replicated until the changes have been committed. Thus, a transaction may be limited to using the replica at which the transaction's uncommitted changes were made, even though the format of the data at the other replica may be more efficient for some operations.

The replicated data, such as those in column-major format, is periodically refreshed to maintain synchronicity with the primary data, such as those in row-major format. Refreshing replicated data may comprise rewriting entire columns-worth of data during a dedicated maintenance window time period to maintain the columnar representation. Not only is a significant amount of data updated during a refresh cycle, but refresh cycles need to be repeated at least periodically because replicated data may be subject to continuous change during online transaction processing (OLTP). Thus, each refresh cycle consumes considerable resources and the column stores are made unavailable for OLTP.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2a is a block diagram of a table used for examples;

DETAILED DESCRIPTION

Figure 1:
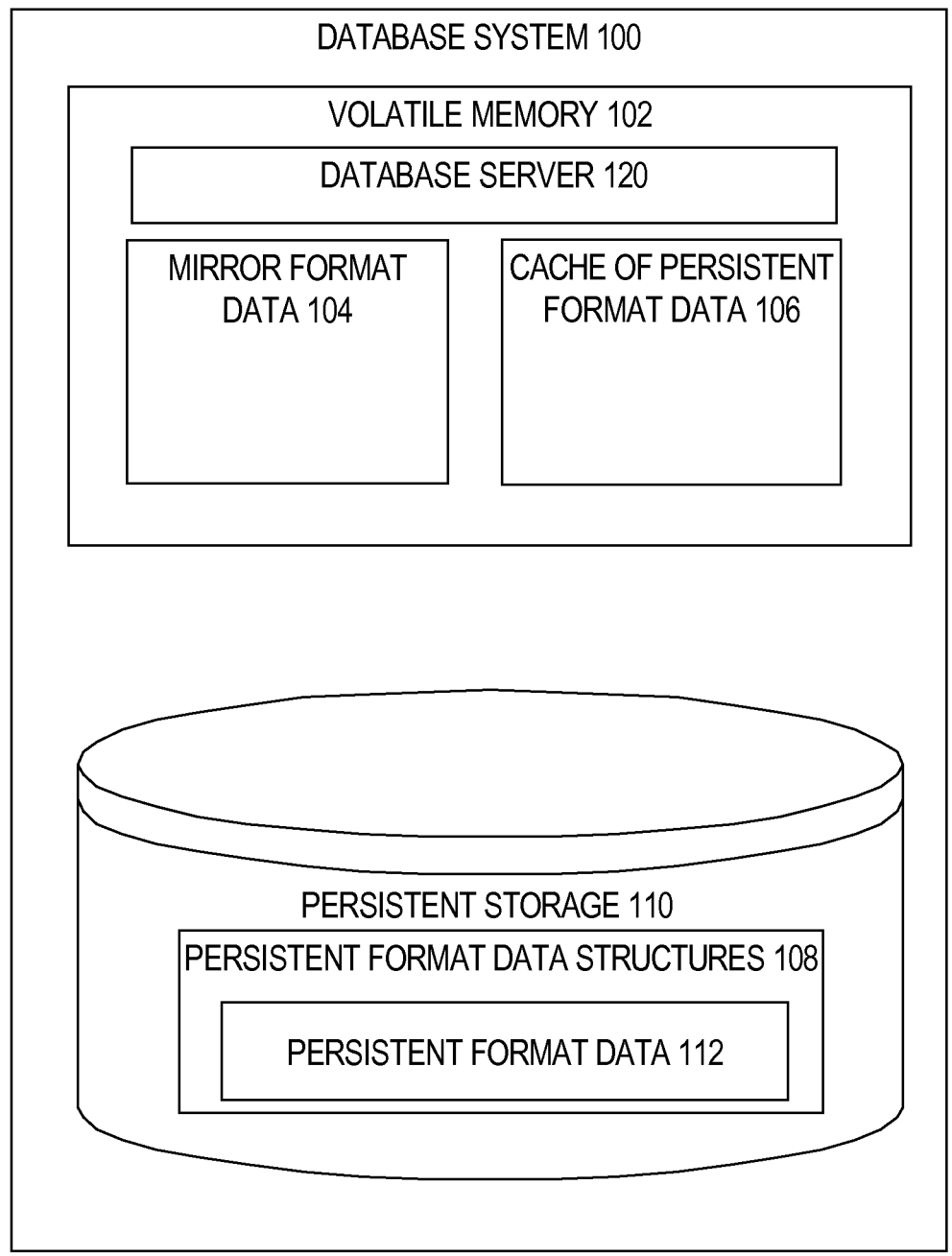
FIG. 1 is a block diagram of a database system that concurrently maintains mirror format data in volatile memory and persistent format data on persistent storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Different data formats have different benefits. Therefore, techniques are described herein for maintaining data persistently in one format, but making that data available to a database server in more than one format. In one embodiment, one of the formats in which the data is made available for query processing is based on the on-disk format, while another of the formats in which the data is made available for query processing is independent of the on-disk format.

The format that corresponds to the on-disk format is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data. For example, in one embodiment, the persistent format is row-major disk blocks, and the mirror format is a column-major format.

According to one embodiment, the mirror format is completely independent of the persistent format. However, the MF data is initially constructed in memory based on the persistently stored PF data, not based on any persistent MF structures. Since persistent MF structures are not required, users of existing databases need not migrate the data or structures in their existing databases to another format. Thus, a conventional database system that uses row-major disk blocks may continue to use those disk blocks to persistently store its data without performing any data migration, while still obtaining the performance benefit that results from having a column-major representation of the data available in volatile memory.

In-memory MF data is maintained transactionally consistent with the PF data. The MF data is transactionally consistent in that any data items provided to a transaction from the MF data will be the same version that would have been provided if the data items were provided from the PF data. Further, that version reflects all changes that were committed before the snapshot time of the transaction, and no changes that were committed after the snapshot time of the transaction. Thus, when a transaction, that made a change to a data item that is mirrored in the MF data, is committed, the change is made visible relative to both the PF data and the MF data. On the other hand, if a transaction that made a change is aborted or rolled back, then the change is rolled back relative to both the PF data and the MF data.

In one embodiment, the same transaction manager that ensures consistency among the reads and writes of the PF data is also used to ensure consistency among the reads and writes of the MF data. Because the MF data is kept current in a transactionally consistent manner, if the in-memory MF data includes the data required by a database operation, then the database operation may be satisfied either from the in-memory MF data, or from the PF data.

The MF data mirrors data that already exists in the PF data. However, while all items in the MF data are mirror versions of corresponding items in the PF data (albeit organized in a different format), not all items in the PF data need be mirrored in the MF data. Thus, the MF data may be a subset of the PF data.

Because not all of the PF data is necessarily mirrored in the MF data, in some situations queries may require data that can only be satisfied by the PF data. For example, if a table has columns A, B and C, and only column A is mirrored in the MF data, then a query that requires values from column B must obtain those values from the PF data.

However, even in those circumstances, the MF data may still be used to (a) satisfy a portion of the query, and/or (b) speed up the retrieval of required data from the PF data. For example, the MF data may be used to identify the specific rows that must be retrieved from the PF data.

According to one embodiment, to reduce overhead, no on-disk copy of the MF data is maintained. In an alternative embodiment, a copy of the MF may be stored, but no attempt is made to keep the on-disk copy of the MF data in sync with updates that are being performed on the PF data. Consequently, after a failure, the in-memory MF data must be reconstructed based on the persistent copy of the PF data.

In some embodiments, the MF data is compressed. The compression can be performed at various compression levels, either specified by the user or based on access patterns.

While examples shall be given hereafter in which the mirror format is columnar, the mirror format may be any format, different from the persistent format, that is useful for running in-memory queries. For example, in an alternative embodiment, the PF format is column-major, while the MF format is row-major. Regardless of the particular mirror format used, the mirror format data is created in memory based on existing PF structures (e.g., tables and indexes) without causing a change to the format of those structures.

General Architecture

FIG. 1 is a block diagram of a database system according to one embodiment. Referring to FIG. 1, database system 100 includes volatile memory 102 and persistent storage 110. Volatile memory 102 generally represents the random access memory used by the database system, and may be implemented by any number of memory devices. Typically, data stored volatile memory 102 is lost when a failure occurs.

Persistent storage 110 generally represents any number of persistent storage devices, such as magnetic disks, FLASH memory, and/or solid state drives. Unlike volatile memory 102, data stored on persistent storage 110 is not lost when a failure occurs. Consequently, after a failure, the data on persistent storage 110 may be used to rebuild the data that was lost in volatile memory 102.

Within volatile memory 102, a database server 120 is executing database commands that are submitted to the database server by one or more database applications (not shown). The data used by those applications is illustrated as PF data 112. PF data 112 resides on persistent storage device 110 in PF data structures 108. The PF structures 108 may be, for example, row-major disk blocks. While row-major disk blocks are used for the purposes of illustration, the PF structures may take any form, such as column-major disk block, hybrid compression units where some data is arranged in column-major format and other data is arranged in row-major format, etc.

The volatile memory 102 further includes a cache 106 of PF data. Within cache 106, the data is stored in a format that is based on the format in which the data resides within the PF data structures 108. For example, if the persistent format is row-major disk blocks, then cache 106 may contain cached copies of row-major disk blocks.

On the other hand, MF data 104 is in a format that is unrelated to the persistent format. For example, in the case where the persistent format is row-major disk blocks, the mirror format may be column-major compression units. Because the mirror format differs from the persistent format, the MF data 104 is produced by performing transformations on the PF data. These transformations occur both when volatile memory 102 is initially populated with MF data 104 (whether at start-up or on-demand), and when volatile memory 102 is re-populated with MF data 104 after a failure.

Significantly, the existence of MF data 104 may be transparent to the database applications that submit database commands to the database server that makes use of the MF data 104. For example, those same applications, designed to interact with database systems that operate exclusively on PF data 112, may interact without modification with a database server that maintains MF data 104 in addition to the PF data 112. Further, transparent to those applications, that database server may use the MF data 104 to more efficiently process some or all of those database commands.

The Mirror Format Data

MF data 104 may mirror all of the PF data 112, or a subset thereof. In one embodiment, a user may specify what portion of the PF data 112 is "in-memory enabled". The specification may be made at any level of granularity. For example, the specification of what is in-memory enabled may be made at least at the following levels of granularity:
  the entire database
  specified tables
  specified columns
  specified row ranges
  specified partitions
  specified segments
  specified extents As shall be described hereafter, in-memory enabled data is converted to the mirror format and stored as MF data 104 in volatile memory. Thus, when in-memory enabled data is required by a query, the database server has the option of providing the data from either the PF data 112 or the MF data 104. The conversion and loading may occur at the time the database is started, or in a lazy or on-demand fashion. Data that is not in-memory enabled is not mirrored in the MF data 104. Consequently, when such data is required by a query, the database server does not have the option of obtaining the data from the MF data 104.

For the purpose of explanation, it shall be assumed that PF data structures 108 include the table 200 illustrated in FIG. 2A. Table 200 includes three columns c1-c3, and six rows r1-r6. While the illustration of table 200 in FIG. 2A portrays how the data is logically organized on persistent storage 110, the actual format in which the data is physically stored may be quite different.

Figure 2B:
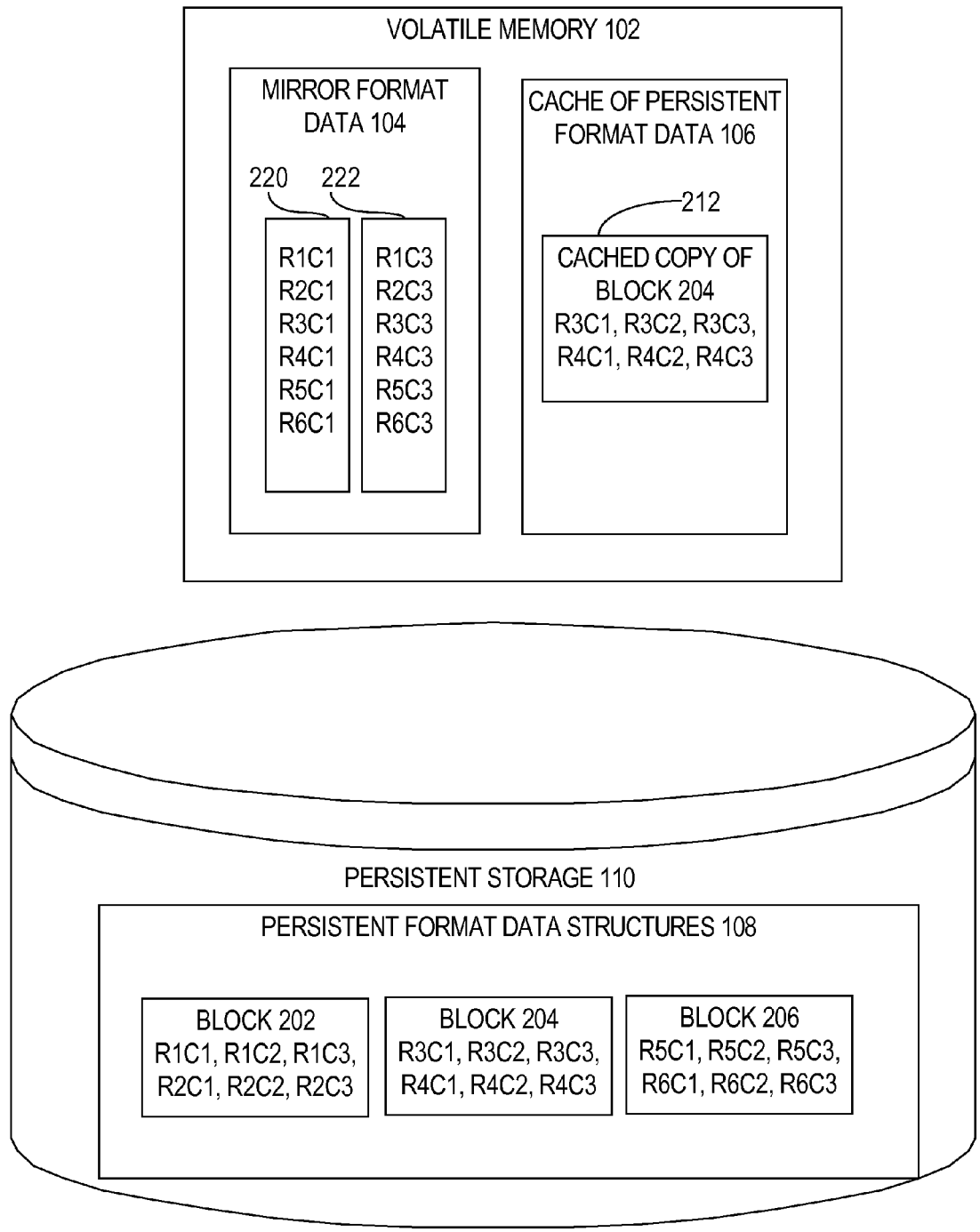
FIG. 2b is a block diagram of how data items for a table may be concurrently maintained in two formats, one of which is an in-memory format, according to an embodiment.

Specifically, referring to FIG. 2B, it illustrates how the data that resides in table 200 may be physically organized on persistent storage 110. In the present example, the data for table 200 is stored in three row-major disk blocks 202, 204 and 206. Block 202 stores the values for all columns of row r1, followed by the values for all columns of row r2. Block 204 stores the values for all columns of row r3, followed by the values of all columns of row r4. Finally, block 206 stores the values of all columns of row r5, followed by the values of all columns of row r6.

Copies of some of those disk blocks may be temporarily stored in cache 106. In the example illustrated in FIG. 2B, a cached copy 212 of block 204 resides in cache 106. Cache 106 may be managed using any one of a variety of cache management techniques, and the embodiments described herein are not limited to any particular cache management technique. In general, such techniques attempt to retain in volatile memory 102 copies of the disk blocks that are most likely to be requested in the near future. Consequently, when cache 106 runs out of space, cached copies of disk blocks that are less likely to be requested are replaced by copies of blocks that are more likely to be requested.

In contrast to the data in cache 106, the mirror format data 104 is not formatted in a manner that is based on the persistent format. In the illustrated example, mirror format data 104 includes two column vectors 220 and 222. Each column vector stores a contiguous series of values from a single column of table 200. In the present example, column vector 220 stores values from column 1 of table 200, and column vector 222 stores values from column 3 of table 300. In this example, the MF data 104 mirrors a subset of the PF data because MF data 104 does not include column vectors for column 2 of table 200.

Organization of the MF Data

According to one embodiment, even though the MF data uses a different format than the PF data, the MF data is organized in a manner that corresponds to the organization of the PF data. For example, on persistent storage 110, the PF data may be stored in blocks that reside in extents which, in turn, are organized into segments. Under these circumstances, within volatile memory 102, the MF data 104 may be organized based on the extents and/or segments to which the data belongs. Thus, column vector 220 may be divided into vector portions, each of which corresponds to a particular range of extents and/or segments.

Within the extents, data is typically ordered by rowid. Similarly, in one embodiment, the MF data 104 is ordered based on rowid. For example, the values in column vector 220 are ordered based on the same rowids that are used to order the PF data in blocks 202, 204 and 206. Specifically, rowid r1 immediately precedes rowid r2, so r1c1 immediately precedes r2c1 in column vector 220, and r1c1 to r1c3 immediately precede r2c1 to r2c3 in block 202.

In alternative embodiments, some or all of the data items in the MF data 104 are not ordered, within the MF data 104, by rowid. Storing the data items in a different order may be useful, for example, if the different ordering produced significantly better compression. As another example, the column vectors may initially be ordered by rowid. However, when new updates are "merged into" the column vectors (as shall be discussed in greater detail hereafter), the updated values may appended to the end of the existing column vectors to avoid having to decompress and recompress the existing column vectors.

When the data items within the column vectors are not in rowid order, an in-memory index may be built on rowid to quickly locate within the MF data 104 the data items associated with any given rowid.

Figure 3:
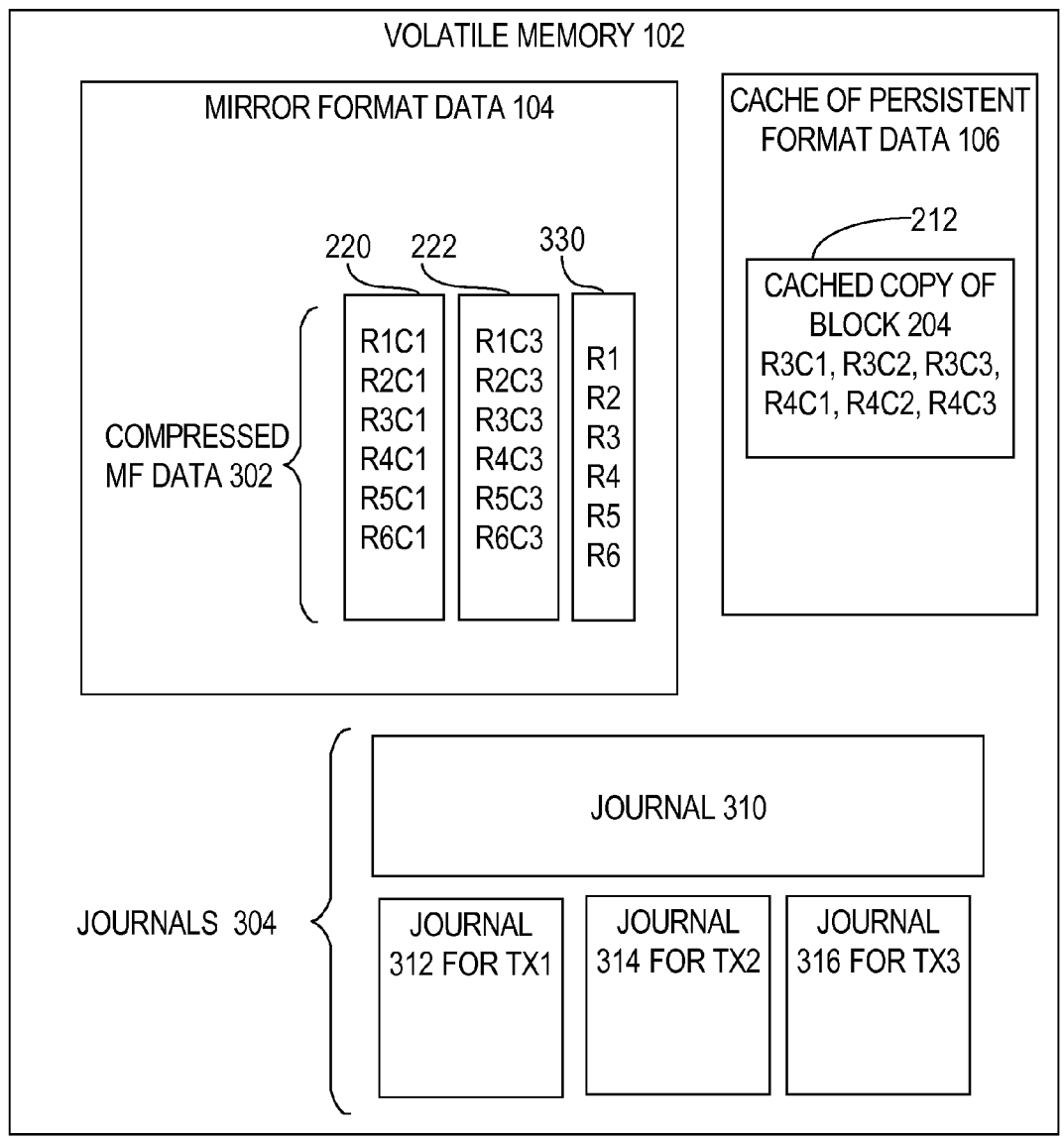
FIG. 3 is a block diagram that illustrates journals stored in volatile memory in conjunction with mirror format data, according to an embodiment.

Whether or not the data items within the column row vectors are ordered based on rowid, a rowid-to-item mapping may be established by maintaining a vector of rowids in conjunction with the column vectors. For example, FIG. 3 illustrates a rowid vector 330 that is maintained in addition to the column vectors 220 and 222. The first value (R1) in the vector of rowids is the rowid of the first data item in each of the column vectors. Similarly, the second value in the vector of rowids (R2) is the rowid of the second data item in each of the column vectors.

In embodiments where the organization of the MF data corresponds to the organization of the PF data, it is easier for the database server to split database operations between the MF data and the PF data. For example, the database server may determine that the MF data is to be used to satisfy a query relative to one range of extents (e.g. extent 1 to extent 10), while PF data is to be used to satisfy the query relative to another range of extents (e.g. extent 11 to extent 20).

Using the MF Data to Satisfy Queries

A conventional database system may operate normally by responding to every query by first searching for the requested data in cache 106. If the data is in cache 106, the data is accessed from cache 106. Otherwise, the needed data is loaded from PF data structures 108 into cache 106, and then accessed from cache 106. However, because the data in both cache 106 and PF data structures 108 is in the persistent format, performing operations based exclusively on the PF data does not always provide the best performance.

Therefore, according to one embodiment, the database server uses the MF data 104 to supply data items required by at least some requested database operations. For example, if a database query requests the values from column 1 of all rows, the database server may obtain those values from the column vector 220 without accessing persistent storage 110. In the absence of MF data 104, the database would only be able to obtain R3C1 and R4C1 without accessing persistent storage 110 (because currently only block 204 is in cache 106). To obtain R1C1 and R2C1, block 202 must be loaded into cache 106, and to obtain R5C1 and R6C1, block 206 must be loaded into cache 106. The time it would take to load blocks 202 and 206 into cache would be significantly more than the time required to obtain the values directly from column vector 220.

Using the MF Data to Evaluate Predicates

Even in situations where the data required by a database operation is not included in the mirror format data 104, the mirror format data 104 may be used to evaluate predicates, and thereby speed up the database operations in the same manner as conventional indexes. For example, assume that table 200 has thousands of rows, and in only three of those rows does column c1 have the value "joe". Under these circumstances, a database server may receive a database command that requests the values, from column c2, of all rows where c1="joe".

In this example, the data that needs to be returned by the database command is from column c2, which is not in the MF data 104. However, the column vector 220 for column 1 may be used to quickly identify the three rows where c1="joe". This operation can be performed efficiently because the data items required to evaluate the predicate (values from c1) are stored contiguously in volatile memory. Once those rows have been identified using column vector 220, the database server may retrieve from disk only those blocks needed to obtain the data from those three rows.

Without using the MF data, a conventional index built on column c1 may be used to evaluate the predicate "where c1=joe". However, some disk I/O may be necessary to use of the conventional index to perform this evaluation, whereas no disk I/O is needed to evaluate the predicate using column vector 220. Further, maintaining such an index can incur significant overhead.

Without using mirror format data 104 or a conventional index, the database server would have to load from persistent storage 110 every disk block that (a) is not already in cache 106, and (b) stores data for table 200. These blocks would have to be loaded merely to compare the values of column c1 against "joe" to identify the three rows for which c2 is required by the database command.

Because MF data 104 may be used for the same function as conventional indexes (i.e. to efficiently identify which rows satisfy criteria specified in a database command), a database system that uses MF data 104 need not have as many conventional indexes as would otherwise be necessary for efficient predicate evaluation. For example, if the MF data 104 includes a column vector for c1 and a column vector for c3, then the database server need not maintain conventional indexes for columns c1 or c3. By reducing the number of conventional indexes that need to be maintained by a database server, the overhead associated with making updates may be significantly reduced.

In-Memory Indexes

As explained above, when a predicate references a column, the column vector for that column may be used to evaluate the predicate. In this way, column vectors may be used instead of conventional indexes. To provide even faster predicate evaluation, in-memory indexes may be used. An in-memory index is an index stored entirely within volatile memory. The nature of the in-memory index may vary based on the characteristics of the data being indexed. For example, if low-cardinality keys are being indexed, the in-memory index may be a binary index. If high-cardinality keys are being indexed, then the in-memory index may be a B-tree. Regardless of the nature of the in-memory index, the entries in the index point to in-memory location of the data items in question, rather than on-disk locations.

Compression

As mentioned above, the MF data may be compressed. However, according to one embodiment, not all MF data need be compressed in the same way, or to the same degree. For example, if it is determined that the data from column c1 of table 200 is used frequently, and the data from column c3 is used infrequently, then the data in column vector 220 may be lightly compressed, or uncompressed, whereas the data in column vector 222 is highly compressed.

The compression algorithm, and the level of compression used by the algorithm, that is used to compress each portion of the MF data may be specified by a user, or may be determined automatically by a database server based on various factors. Possible compression algorithms include, but are not limited to, dictionary-based compression, run-length encoding (RLE), Ozip compression, etc.

The factors used by the database server to determine how each portion of MF data is compressed may include, for example, the frequency with which each portion is accessed, and how much data is in the portion, and how much volatile memory is available. In general, the more frequently a portion of the MF data is accessed, the less compressed the data. As another general rule, the less volatile memory that is available to store the MF data and/or the larger the size of the portion of the MF data, the higher the compression.

Even though data items may be compressed within the MF data, it may not be necessary to decompress the MF data to use it. For example, vector processing operations may be performed directly on compressed values, as described in U.S. patent application Ser. No. 13/708,054, filed Dec. 7, 2012, the entire contents of which are incorporated herein by reference. As also described in that application, it is also possible for the decompression to be performed on-chip after the compressed column vector values have been transferred to the CPU.

In-Memory Compression Units (IMCUs)

Figure 4:
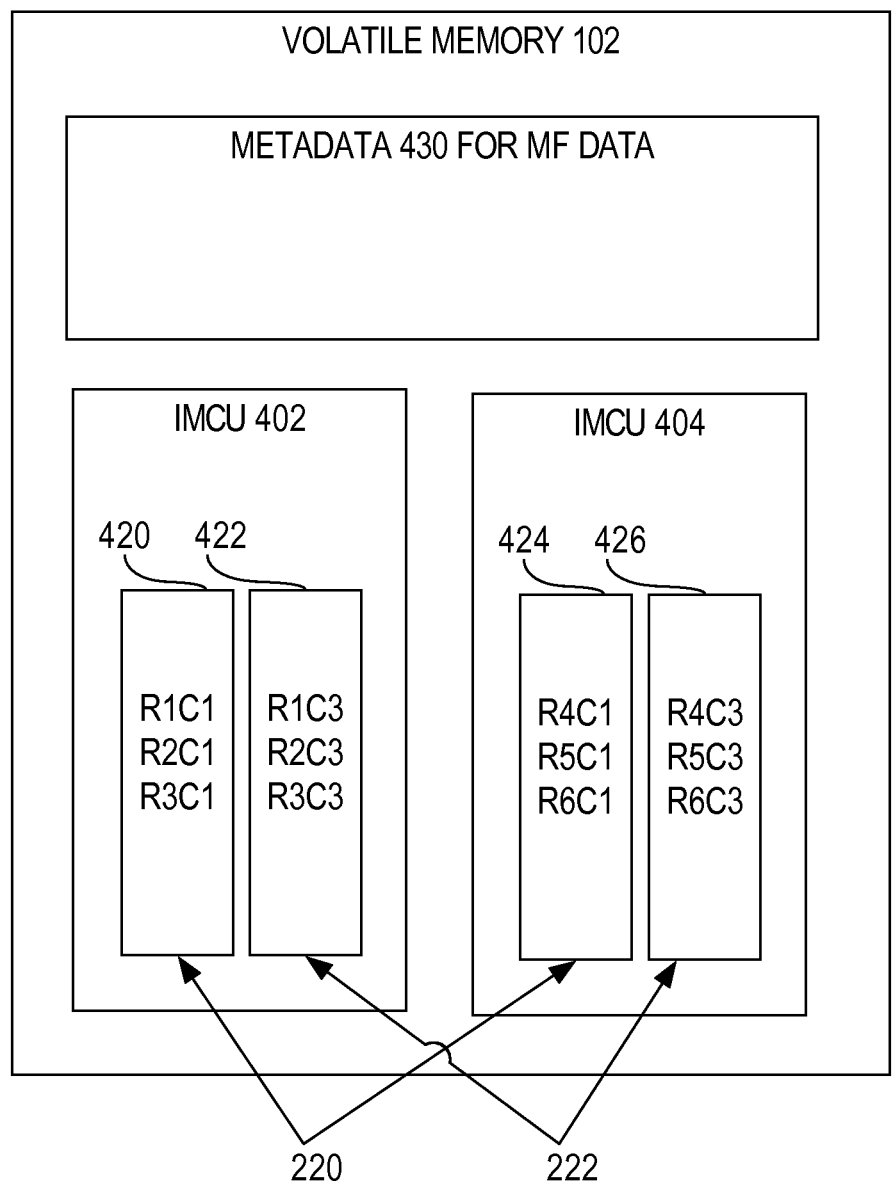
FIG. 4 is a block diagram illustrating how the data from a single table may be divided between IMCUs based on row ranges, according to an embodiment.

In an embodiment in which the MF data is compressed, the MF data may be organized, within volatile memory 102, into "in-memory compression units" (IMCUs). Each IMCU stores a different set of MF data. For example, as illustrated in FIG. 4, IMCU 402 stores half of column vectors 220 and 222, and IMCU 404 stores the other half of column vectors 220 and 222. Specifically, IMCU 402 includes a vector portion 420 that stores half the values from column c1, and a vector portion 422 that stores half the values from column c3. Similarly, IMCU 404 includes a vector portion 424 that stores the other half of the values from column c1, and a vector portion 426 that stores the other half the values from column c3.

In this example, the IMCUs divide the MF data based on the rows to which the data belongs, where IMCU 402 corresponds to rows r1 to r3 of table 200, and IMCU 404 corresponds to rows r4-r6 of table 200. However, this is only one of many different ways that the MF data may be spread among IMCUs. For example, different IMCUs may store MF data for different tables, different partitions of a table, different columns of a table, different segments, different extents, etc.

Metadata for the MF Data

To determine whether the MF data has the data required to process a query, and if so, to find the MF data required to process the query, the database server needs to know which PF data is mirrored in the MF data, and specifically which specific PF data is mirrored by each IMCU. Therefore, according to one embodiment, metadata 430 for the MF data is maintained in volatile memory 102, as illustrated in FIG. 4.

In one embodiment, metadata 430 includes a data-to-IMCU mapping. The data-to-IMCU mapping indicates which data is contained in each IMCU. This indication may be made in a variety of ways, including storing data that indicates, for each IMCU, one or more of the following:
 the table(s) whose data is stored in the IMCU
 the column(s) whose data is stored in the IMCU
 the range of rows stored in the IMCU
 the range of the disk blocks whose data is stored in the IMCU
 the segments whose data is stored in the IMCU
 the table partitions whose data is stored in the IMCU
 the extents whose data is stored in the IMCU
 the manner in which the data, within the IMCU, has been compressed
 the dictionary for decompressing the data stored in the IMCU (when a dictionary-type encoding has been used to compress the PF data)

In the situation illustrated in FIG. 4, the data-to-IMCU mapping may indicate, for example, that rows r1-r3 of columns c1 and c3 of table 200 are stored in IMCU 402, and that rows r4-r6 of columns c1 and c3 of table 200 are stored in IMCU 404.

Multi-Instance Environments

In some environments, the same PF data is accessed by multiple database server instances. Such environments are referred to herein as multi-instance environments. In a multi-instance environment, each database server instance may have access to volatile memory that the other database server instances cannot access directly. In such situations, one may populate the volatile memory of each of the database server instances with the same MF data, or may cause different portions of the MF data to be stored in the volatile memories of different database server instances. In the case where different portions of the MF data is stored in the volatile memories of different database server instances, metadata 430 may also include an IMCU-to-instance mapping.

Figure 5A:
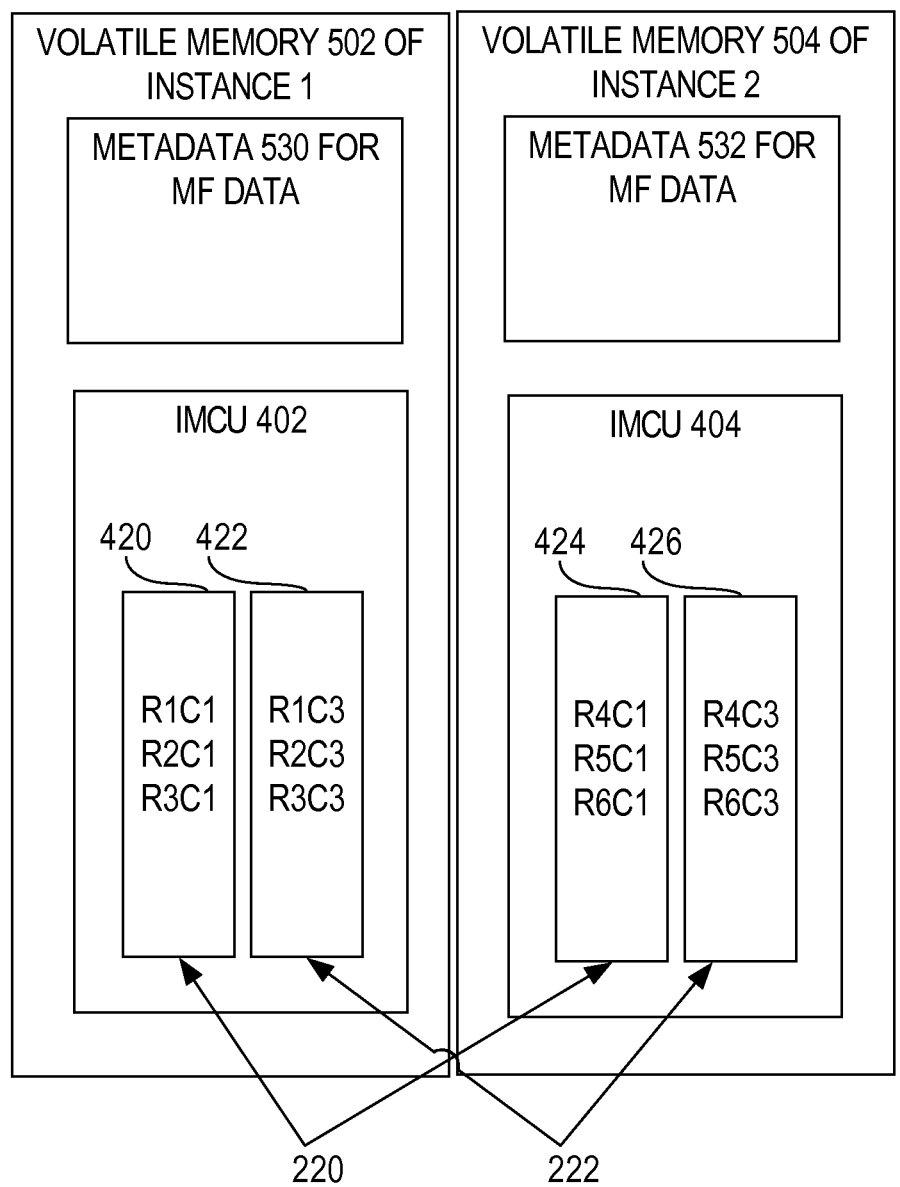
FIG. 5a is a block diagram illustrating how different database server instances may be assigned to manage different sets of MF data, where the sets are based on row ranges.

For example, referring to FIG. 5a, it illustrates an embodiment in which IMCU 402 is stored in the volatile memory 502 of one database server instance (instance 1), and IMCU 404 is stored in the volatile memory 504 of another database server instance (instance 2). For the database servers to know where specific portions of the MF data reside, each maintains metadata (530 and 532) to indicate both (a) where IMCUs 402 and 404 reside, and (b) what data they contain.

In FIG. 5a, MF data from the same two columns (c1 and c3) is distributed between two database instances. However, it is also possible to distribute the MF data among database servers on other basis. For example, different instances may have the MF data for different tables, different columns, different partitions, different segments, different extents, etc.

Figure 5B:
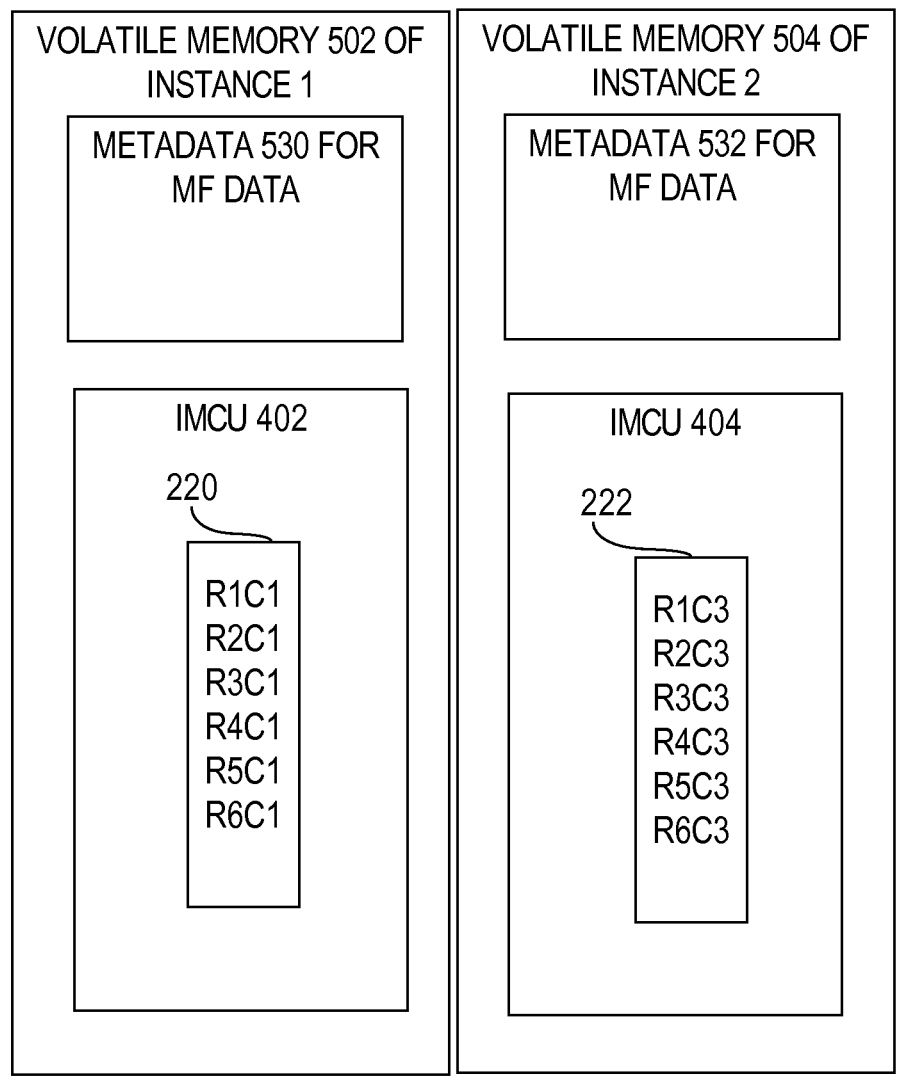
FIG. 5b is a block diagram illustrating how different database server instances may be assigned to manage different sets of MF data, where the sets are based on columns.

FIG. 5b is a block diagram of a scenario in which the MF data is distributed among the database instances based on column. Specifically, in FIG. 5b, the IMCU 402 stored in the volatile memory 502 of instance 1 includes the entire column vector 220 for column c1, while the IMCU 404 stored in the volatile memory 504 of instance 2 includes the entire column vector 222 for column c3.

Because it is more efficient to access local data than to obtain data from a remote instance, the location of the MF data may be a factor in determining whether to obtain a particular data item from the MF data or the PF data. For example, in the scenario illustrated in FIG. 5b, if a query that is being executed by the database server of instance 1 requires data from column c1, the database server may decide to obtain the data from column vector 220, rather than from the PF data. On the other hand, if the same query being executed by the same database server requires data from column c3, then the database server may decide to obtain the data from the PF data.

When a database server determines that it is more efficient to perform an operation using MF data that resides in a remote instance that to use the PF data, the database server requests the remote instance to perform the operation. For example, in the scenario illustrated in FIG. 5b, if the database server of instance 1 is executing a query with the predicate "where c3=X", the database server of instance 1 would request the database server of instance 2 to evaluate "where c3=X" using column vector 222. In response to evaluating the predicate, the database server of instance 2 would return to the database server of instance 1 data that indicates which rows satisfy the predicate.

Keeping the Mirror Format Data in Sync

The MF data 104 is only useful if the MF data 104 is kept up to date with all changes being made to the PF data. For example, if a query calls for the current values from column c1, then column vector 220 can only be used if its values are current. Similarly, if a query calls for current values of c2 from rows where c1="joe", then column vector 220 can only be used to identify the rows where c1="joe" if the values in the column vector 220 are current.

Consequently, a mechanism is provided for keeping the mirror format data 104 in sync with the PF data as updates, inserts and deletes are performed on the PF data. Specifically, in one embodiment, the transaction manager of a relational database server, which is conventionally designed to transactionally update the PF data, is modified to concurrently transactionally update the MF data. For example, when the transaction manager updates a particular item in the PF data as part of a transaction, the transaction manager also updates the particular item in the MF data (if the particular item is in the MF data) as part of the same transaction.

By maintaining MF data 104 and the PF data transactionally synchronized, the result set of a query will be the same regardless of whether the query was processed using data items obtained exclusively from the MF data 104, or data items obtained exclusively from the PF data. The result set will also be the same if the query is processed using some data items from MF data 104, and other data items from the PF data.

In-Place Updates to MF Data

For the MF data to remain transactionally consistent with the PF data, changes are made permanent to the MF data at the same time the changes are made permanent to the PF data. For example, when a transaction that changed r1c1 from X to Y commits, r1c1 must be changed from X to Y in both the PF data and the MF data.

In some situations, it is possible to directly update the MF data to reflect a change made by a transaction when the transaction commits. For example, if column vector 220 is either uncompressed, or compressed in a manner that produces fixed-width values, it is possible to directly change the value of r1c1 from X to Y in the column vector 220 when the transaction commits, without otherwise affecting the column vector 220 or incurrent significant overhead.

However, in other situations, it may be necessary to update the MF data implicitly. When updated implicitly, the MF data itself does not necessarily change, but metadata is stored to indicate that the values contained therein have been updated. As shall be described in greater detail hereafter, the metadata used to record implicit updates to the MF data may include journals and changed-row bitmaps.

Journals

In some embodiments, keeping the MF data in sync with updates to the PF data is complicated by the fact that the MF data may be in a compressed format. For example, if column vector 220 is compressed, then directly updating a value within the column vector 220 may require the entire column vector to be decompressed, the update performed, and then the entire column vector to be compressed again. It would not be efficient to perform such operations in response to every update performed on the PF data.

To reduce the amount of decompression and decompression operations required to keep the MF data in sync, one embodiment makes use of journals to make implicit updates to the MF data. In general, journals store information about updates (a) made to the PF data, and (b) not yet made directly to the MF data.

Referring to FIG. 3, it illustrates an embodiment in which journals 304 are maintained in conjunction with column vectors 220 and 222. In the embodiment illustrated in FIG. 3, column vectors 220 and 222 store compressed MF data 302. Because the data within the column vectors 220 and 222 is compressed, a significant amount of overhead would be required to directly update the data within the column vectors 220 and 222.

While journals 304 are also in volatile memory 102, journals 304 generally contain uncompressed data 302 that indicates changes made to the PF data that is not yet reflected in column vectors 220 and 222. For example, if the value of R3C1 of table 200 is updated from X to Y, rather than change the value of R3C1 in column vector 220, an entry is stored in one of journals 304 to indicate that R3C1 has been changed, and to record the new value for R3C1.

Journals 304 include a global journal 310 and numerous private journals. In general, global journal 310 records only those changes that have been made by committed transactions. Before transactions commit, the changes made by the transactions are stored in the private journals, as explained in greater detail hereafter.

Journals 304 may include entries for rows that do not exist in the MF data. For example, assume that the MF data for table 200 is created at time T1, and at time T2 a new row is inserted into table 200. Under these circumstances, an entry for the new row will initially be added to private journal of the transaction that inserted the row, and the entry for the new row will be moved to the global journal for table 200 when that transaction commits.

According to one embodiment, all journals support full transactional semantics (e.g. queries, DMLs, rollback to savepoint, rollback/abort, parallel queries/DMLs, and distributed transactions). In addition, journals can interoperate with the on-disk database system. For example, when the data is purged from an in-memory journal, required changes can be obtained from the PF data on disk, if a query needs them.

Private Journals

As mentioned above, journals 304 are used to store data that indicates (a) changes made to the PF data that (b) are not yet reflected in the MF data stored in IMCUs. Such changes are typically made by database servers as part of transactions. According to one embodiment, in addition to having a single "global" journal, such as journal 310, for all such changes, a separate "private" journal is maintained for each transaction.

For example, FIG. 3 illustrates the situation in which three transactions TX1, TX2 and TX3 are making changes to PF data that is mirrored in the compressed MF data 302. In addition to making the changes to the PF data, the transactions make the same changes to the MF data by storing, in their respective private journals, data that indicates what the changes are.

Similar to the changes made to the PF data, those changes reflected in the private journal of a transaction are not considered permanent until the transaction commits. Consequently, the changes reflected in the private journal of any given transaction will not be visible to other transactions until the given transaction commits. In the example shown in FIG. 3, the contents of journal 312 will be ignored by transactions TX2 and TX3. The contents of journal 314 will be ignored by transactions TX1 and TX3. The contents of journal 316 will be ignored by transactions TX1 and TX2.

Moving Journal Entries Upon Commit

The global journal is visible system-wide, since all changes reflected therein have been committed. Thus, in response to transaction TX1 committing, the changes reflected in the private journal 312 of TX1 are moved to the global journal 130. Similarly, in response to transaction TX2 committing, the changes reflected in the private journal 314 of TX2 are moved to the global journal 130. Likewise, in response to transaction TX3 committing, the changes reflected in the private journal 316 of TX6 are moved to the global journal 130.

As mentioned above, when a transaction commits, the contents of that transaction's private journal are moved to the appropriate global journals. In embodiments where the global journals are maintained on a per-IMCU basis and the private journals are maintained on a per-transaction basis, moving the private journal entries of a committed transaction may involve moving some of the entries to the global journal of one IMCU, and some entries to the global journal of another IMCU.

For example, assume that a transaction modifies a first set of data that maps to a first IMCU, and modifies a second set of data that maps to a second IMCU. Prior to commit, entries for both sets of modifications are stored in the private journal of the transaction. However, when the transaction commits, the entries for modifications to the first set of data are moved to the global journal for the first IMCU, and entries for modifications to the second set of data are moved to the global journal for the second IMCU.

After a transaction's changes are persistently committed to the PF data, the transaction is assigned a commit time. In response to being assigned a commit time, the journal entries of the transaction are updated to reflect the commit time. Once a transaction's journal entries are moved to the appropriate global journals and updated with the commit time of the transaction, the changes reflected in those entries become visible to other transactions.

As mentioned above, data within an IMCU need not be arranged in rowid order. When not in rowid order, the column vector of rowids (e.g. vector 330) may be used to locate data within an IMCU based on rowid. Specifically, the position of a rowid within vector 330 is the position of the values for the corresponding row within the other vectors 220 and 222. According to one embodiment, even when the data within an IMCU is not arranged in rowid order, the entries in the corresponding private and global journals are organized based on rowid. Thus, when data in an IMCU is invalidated due to an update made to the corresponding PF data, the rowid of the invalidated data is recorded, rather than the position of that data within the IMCU.

Journal Entry Contents

In general, each journal entry contains all information required to determine (a) what data items are in the entry, and (b) what version of those data items does the entry reflect. In one embodiment, each journal entry includes:
 the rowid of the row associated with the entry
 a timestamp that indicates when the data contained in the row was "current"
 values for one or more columns of the corresponding row
With respect to the column values, in one embodiment, each journal entry includes full row images that result from all Data Manipulation Language (DML) operations. In such an embodiment, the journals are initially row-major data stores. However, under certain circumstances (such as when the journals grow too large), the contents of the journal may be converted to a column-major row store. The column-major information in the journals would only need to include values for those columns that are mirrored in the MF data.

In on embodiment, a threshold is established for how many rows a journal may have in row-major format. Once that threshold is exceeded, a conversion operation is triggered for converting some or all of the journal's row-major data to a column-major format. The threshold may be, for example, that a journal may have no more than 1000 rows of row-major data.

Journal Indexes

According to one embodiment, an index, maintained in volatile memory 102, is built on the rowid column of each private journal. In addition to the rowid column, indexes may be built on any other column of the private journals that will improve overall query processing efficiency. These journal indexes may be used, for example, during query processing to perform look-ups, or range-based scans of the journals.

Journal Structure

According to an embodiment, journals are organized, within volatile memory 102, as a series of temporally-ordered extents. For example, assume that the version time for MF data 104 is T1, and that the current system time is time T10. Under these circumstances, journal 310 may be organized into three extents, the first of which includes journal entries for changes made between time T1 and time T3, the second of which includes journal entries for changes made between time T3 and time T6, and the third of which includes journal entries for changes made between time T6 and the current system time.

When structured in this manner, extent pruning may be used to reduce the number of extents that are processed during a table scan. For example, for a table scan performed for a transaction with a snapshot time of T2, only the first extent of journal 310 would need to be scanned. The other journals contain only changes that the transaction is not allowed to see.

On the other hand, for a table scan performed for a transaction with a snapshot time of T7, all three extents of journal 310 would have to be scanned, because all three could contain journal entries for changes that must be seen by the transaction.

Merging Global Journals into the MF Data

As mentioned above, journals are used because it is inefficient to update the MF data directly every time a database operation makes a change to the corresponding PF data. This is particularly true when the MF data is compressed. However, it is also inefficient to allow the journals to grow indefinitely, both because eventually the journals will require too much volatile memory, and because the larger the journals grow, the less efficient it becomes to use the MF data to satisfy queries.

Consequently, according to one embodiment, the content of the global journals is periodically merged into the MF data. When the MF data is compressed, this merger operation typically involves decompressing the MF data, updating the MF data to reflect the most current committed versions of the items contained therein, and then compressing the MF data.

After data has been merged into the MF data contained in a particular IMCU, the metadata associated with the IMCU is updated to indicate a new version timestamp for the IMCU. For example, if the MF data in an IMCU reflected all changes made as of time T1, then prior to the merger the version timestamp for the IMCU would be T1. If the update involves merging into the MF data of the IMCU all changes that were made up to time T3, then after the merger the version timestamp for the IMCU would be updated to T3.

Post-Merger Retention of Global Journal Entries

As shall be described in greater detail hereafter, in some embodiments, changed-row bitmaps may be used to indicate which data items in the MF data have become stale. A data item in the MF data becomes stale when a change (not reflected in the MF data) is committed to the data item. Once the contents of a global journal have been merged into the corresponding MF data, the old entries in the journals may be purged and the changed-row bitmap is updated to reset all bits (thereby indicating that no data items in the newly-merged MF data are stale). However, in some embodiments, rather than purge all old journal entries in response to merging changes into the MF data, some of the old data may be retained in order to continue to use the MF data for transactions whose snapshot-times are before the merger time.

For example, if the post-merger version timestamp for the IMCU is T3, then a transaction with a snapshot time of T2 cannot use the MF data in the IMCU, because that data contains changes that the transaction is not allowed to see. However, if all the journal entries as of time T1 have been retained, it is possible to use those journal entries, in conjunction with the IMCU, to obtain some data items as of time T2. Specifically, for a data item whose journal entries have been retained, a transaction with a snapshot time of T2 would use the version of the data item from the most recent journal entry that precedes T2, the snapshot time of the transaction.

For example, assume that the journal only has a single entry, and the entry indicates that r5c1 was changed at time T3 from X to Y. Consequently, the post-merger IMCU will have value Y for r5c1. However, to provide the correct value to the transaction, the database server inspects the journal to see that the row of r5c1 was changed between the snapshot time T2 and the version time T3 of the IMCU. Based on this information, the database server knows that the value Y for r5c1 is too recent for the transaction to see, and that the transaction must instead see value X for r5c1. Consequently, in the data obtained for the transaction, the database server changes the value of r5c1 Y to X.

Unfortunately, it is not feasible to retain old journal entries indefinitely. Therefore, according to one embodiment, a configuration parameter is provided for specifying the retention policies associated with IMCUs or the database objects to which they correspond. For example, a retention policy may be that, for table 200, journal entries are retained for at least one hour. Thus, for IMCUs that contain data for table 200, when purging journal entries after a merger, only those journal entries that are associated with snapshot times that are less than an hour old are retained. Retaining already-merged journal entries in this manner ensures that transactions that have snapshot times less than an hour old will always be able to obtain the correct version of data items from the MF data.

According to one embodiment, old journal entries are retained until the database server determines that no currently executing queries will need the old journal entries. For example, if changes are merged into an IMCU at time T10, then journal entries, in the global journal of that IMCU, that are associated with changes made before time T10 may automatically be purged by the database server when there are no more currently-running transactions that have snapshot times before T10.

In some embodiments, the journal entries may store only an indication of which row was changed, and when, without storing the actual values involved. In such an embodiment, the pre-merger journal entries are still useful for indicating which values from the post-merger IMCU cannot be used by a transaction. In the example given above, the version of r5c1 that is in the post-merger IMCU cannot be used for a transaction with a snapshot time of T2, because the journal would indicate that r5c1 was changed between the snapshot time T2 and the version time T3 of the post-merger IMCU. Under these circumstances, if the journal does not have the actual pre-update value of r5c1 (i.e. X), the database server may obtain that value from the PF data, and the rest of the values that it needs from the MF data.

Global Journals and Memory Constraints

As explained above, both global and private journals are maintained in volatile memory. Private journals are used to record changes made by transactions that have not yet committed. Global journals, on the other hand, generally record changes made by transactions that have committed.

The more entries that a global journal has, the more volatile memory is consumed. Under some circumstances, there may simply not be enough volatile memory to store excessively large global journals. One way of handling these situations is to purge older extents of the journals.

For example, assume that the global journal of an IMCU has three extents E1, E2 and E3. Assume further that E1 contains entries for transactions that committed between time T1 and time T5, E2 contains entries for transactions that committed between time T5 and time T9, and E3 has journal entries for transactions that committed between time T9 and the current system time.

Assume further that the version time of the IMCU is T5. Under these circumstances, the entries in E1 may be used to "roll back" the values in the IMCU for transactions that have snapshot times between T1 and T5. On the other hand, the entries in E2 and E3 may be used to "roll forward" the values in the IMCU for transactions that have snapshot times after T5.

When faced with memory constraints, the database server may purge extents E1 only, E1 and E3, or E1, E2 and E3, depending on how much memory is needed. Purging an extent has an effect on performance of certain transactions. For example, assume that E1 is purged. After E1 is purged, a transaction with a snapshot time of T3 may require data items that maps to the IMCU. The transaction may obtain data items that did not change between T3 and T5 from the IMCU. Data items that did change between T3 and T5 are obtained from the PF data, because those items were recorded in E1 which has been purged.

Even after the purging of its journals, an IMCU may be used to supply data that did not change between (a) the version time of the IMCU and (b) the snapshot time of the transaction requesting the data. For example, if the IMCU version time is T1, a transaction with a snapshot time of T5 may obtain data items from the IMCU that were not changed between T1 and T5. As shall be described in greater detail hereafter, those changed data items may be identified using a delete vector generated for the transaction.

Snapshot Metadata Units

Figure 6:
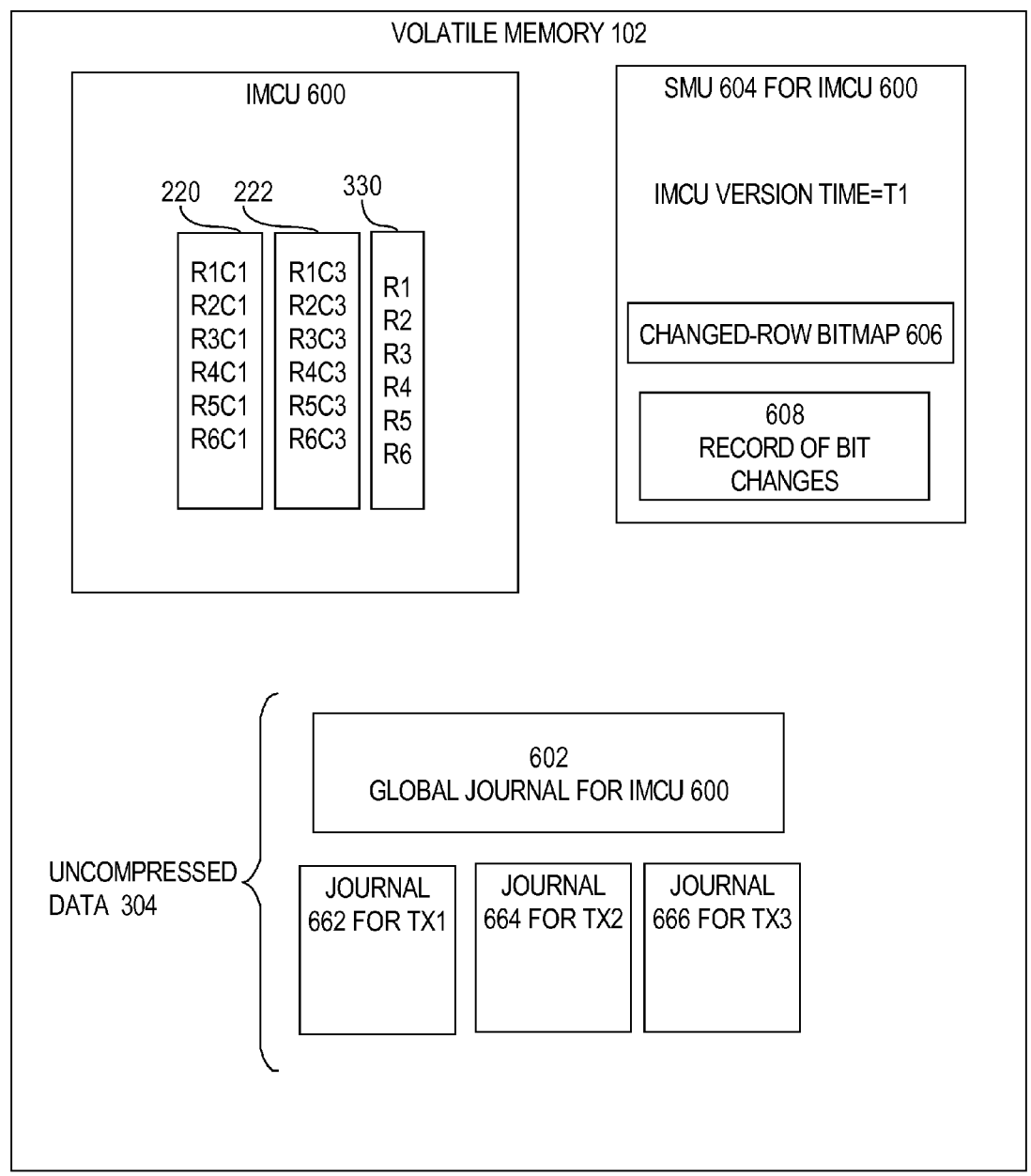
FIG. 6 is a block diagram illustrating an SMU that stores a changed-row bitmap and a record of bit changes, according to an embodiment.

As mentioned above, metadata is maintained for each IMCU. In one embodiment, a Snapshot Metadata Unit (SMU) is responsible for maintaining at least some of that metadata. Referring to FIG. 6, an IMCU 600 is illustrated with its corresponding SMU 604. In the illustrated embodiment, SMU 604 stores the IMCU version time and a changed-row bitmap 606. The IMCU version time is the time at which the values in the IMCU 600 were current. Changed-row bitmaps shall be described in greater detail hereafter.

Among other things, the SMU for an IMCU captures all updates that affect the MF data contained in the IMCU. Consequently, the SMU for an IMCU may indicate, for example, whether the corresponding IMCU has valid values for a given rowid/snapshot-time combination. As another example, the SMU may generate a list of rowids of all rows for which the corresponding IMCU has invalid values, relative to a given snapshot-time. This list may then be used in conjunction with the rowid column vector to identify the rows for which values must be obtained from other sources (e.g. from journals or from the PF data).

Changed-Row Bitmaps

In one embodiment, the updates captured by an SMU are indicated by a "changed-row bitmap" maintained within the SMU. Referring again to FIG. 6, the changed row bitmap 606 for IMCU 600 is maintained in SMU 604. A changed-row bitmap is a bitmap that indicates the rows (a) for which the corresponding IMCU has values, and (b) that have been changed by transactions that committed since the version timestamp of the IMCU.

For example, when a transaction performs an update to rows r1, r3 and r5 of table 200, the SMU 604 for IMCU 600 updates the changed-row bitmap of IMCU 600 by setting the bits that correspond to rows r1, r3, and r5 because those are the updated rows that fall within the MF data of IMCU 600.

According to one embodiment, when a change is made to data that is mirrored in IMCU 600, the SMU 604 stores a record of which bits of the changed-row bitmap 606 were set, and when. These records are collectively represented in FIG. 6 as record of bit changes 608. For example, if an update made at time T1 modifies row r1, then the bit for row r1 would be set, and a record is stored to indicate that the bit for r1 was set at time T1.

According to one embodiment, the changed-row bitmap is created on an as-needed basis. For example, if the changed-row bitmap is to reflect whether a change has occurred to a million rows, a one million bit data structure is not pro-actively initialized. Instead, data is only stored for row ranges that have at least one bit set. For any range for which no data is stored, all bits are deemed to be "0".

Figure 8:
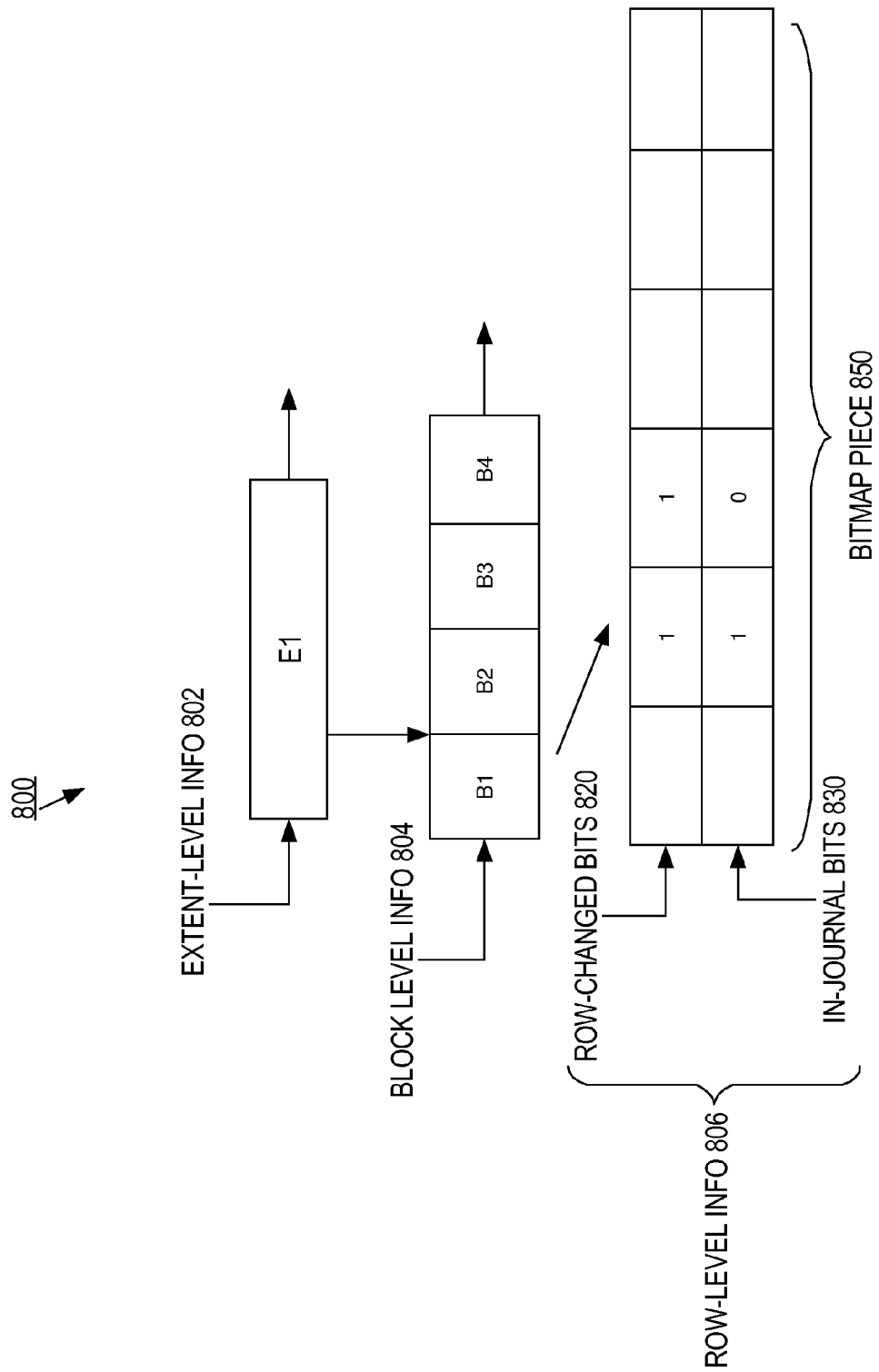
FIG. 8 is a block diagram illustrating a structure for implementing a changed-row bitmap, according to an embodiment.

Referring to FIG. 8, it illustrates a hierarchical structure 800 for representing a changed-row bitmap, according to one embodiment. In the illustrated embodiment, the hierarchical structure 800 has levels that correspond to extents, blocks, and rows. The extent-level information 802 includes a record for each extent in which there is any set bit. Extent-level records link to other extent-level records (not shown), thereby forming a linked list of records for the extents that have one or more set bits.

In addition, the extent records include a pointer to a linked list of block level information 804 for the blocks that reside in the extent. In the illustrated example, the record for extent E1 points to the record for blocks B1, B2, B3 and B4. The block-level record can be the first record in a linked list of block-level records for the blocks that belong to extent E1.

The block-level records, in turn, point to row-level information 806 stored in the form of bitmap pieces. Specifically, in the illustrated embodiment, the record for block B1 points to bitmap piece 850.

Each position in the bitmap piece 850 corresponds to a row whose data items are stored in block B1. In the illustrated embodiment, bitmap piece 850 has six bit positions, which correspond to six rows are stored in B1. For each bit position, bitmap piece 850 includes two bits, one of which is a row-changed bit 820 and the other of which is an in-journal bit 830. For any given row, the row-changed bit indicates that the row changed since data items for the row were stored in the IMCU. The in-journal bit for a row indicates whether the updated values for the row are stored in the IMCU's journal.

Based on the information in data structure 800, the database server may determine whether the current version of a data item resides in the IMCU, in the journals of the IMCU, or in neither. Specifically, if the structure 800 has no information for a given row, then the IMCU has the current version of the data items from the row. The IMCU also has the current version of the data items from the row if the structure 800 has information for the row, and the row-changed bit for the row is "0". If structure 800 has information for the row, the row-changed bit is set and the in-journal bit is set, then the IMCU does not have the current version of the item, but the journal for the IMCU does have the current version of the item. Finally, if structure 800 has information for the row, the row-changed bit is set, and the in-journal bit is not set, then neither the IMCU nor the journals have the current version of the data item, and the current version must be retrieved from the PF data.

The records of structure 800 are created on an as-needed basis. Thus, if the IMCU is current for all data items in a particular extent, then structure 800 may not have any records for the extent. Similarly, if the IMCU is current for all data items in a particular block, then structure 800 may not have any block level information 804 for that block. By only storing changed-row information for extents/blocks that have been changed or added since the version time of the IMCU, structure 800 may be significantly small than it would otherwise be if bits were pre-allocated for every row.

Using the Record of Bit Changes

For a transaction that requires the most recent version of data items, a set bit in the changed-row bitmap 606 indicates that the MF data has stale data for that row, and therefore the IMCU 600 cannot be used to supply data from that row. However, not all transactions require the most recent version of data items.

For example, in many database systems, transactions are assigned a snapshot time, and return data that reflects the state of the database as of that snapshot time. Specifically, if a transaction is assigned a snapshot time of T3, then the transaction must be provided versions of data items that include all changes that were committed before T3, and no changes that were not committed as of T3 (except for changes that the transaction makes itself). For such transactions, a set bit in the changed-row bitmap 606 does not necessarily indicate that the IMCU 600 cannot be used to be the source for items for the corresponding row. Specifically, such transactions may still use the IMCU 600 to obtain data for a particular row, even though the bit for that row is set in changed-row bitmap 606, if the bit was first set after the snapshot time of the transaction.

For example, assume that the column vectors 220 and 222 contain data as it existed at time T1, as indicated by the IMCU version time stored in SMU 604. At a later time T5, an update operation changes row r1. Specifically, the update changes the value of r1c1 for X to Y. In response to this update, the changed-row bitmap 606 of IMCU 600 would change from 000000 to 100000, setting the bit that corresponds to row r1 to "1". In addition, a record is stored within SMU 604 indicating the bit for r1 was changed at T5.

At yet a later time T9, another update operation changes row r3. Specifically, the second update changes the value of r2c3 from A to B. In response to this update, the changed-row bitmap 606 of IMCU 600 would change from 100000 to 101000, setting the bit that corresponds to row r3 to "1". In addition, a record is stored within SMU 604 indicating that the bit for row r3 was set at time T9.

After these updates have occurred, the database server may execute a transaction that reads the values of columns c1 and c3. If the snapshot time of the transaction is earlier than T5, then the transaction may read all the values from column vector 220 and 222. The database may determine this by comparing the snapshot time of the transaction to the times indicated in the record of bit changes 608. If the snapshot time of the transaction is after the IMCU version time, but before any times in the record of bit changes 608, than all values in the IMCU 600 are valid relative to that transaction.

If the snapshot time of the transaction is after T5 but before T9, then the transaction may read all values from column vectors 220 and 222 except the values from row r1, which must be obtained elsewhere (e.g. from a journal or from the PF data). If the snapshot time of the transaction is after T9, then the transaction may read all values from column vectors 220 and 222 except the values from rows r1 and r3, which must be obtained elsewhere.

Delete Vectors

In one embodiment, to account for the snapshot time of transactions that read values that are mirrored in IMCU 600, the changed-row bitmap 606 is used in conjunction of the record of bit changes 608 to create a delete vector for each transaction that seeks to read data from IMCU 600. A delete vector is snapshot-time specific, because bits in the delete vector are only set for rows that were updated before the snapshot-time associated with the transaction for which the delete vector is constructed. Stated another way, each delete vector reflects the version of the changed-row bitmap that was current as of the snapshot-time. Thus, the older the snapshot-time associated with a delete vector, the older the version of the changed-row bitmap the delete vector reflects, and thus fewer the number of bits that will be set in the delete vector.

For a transaction with a snapshot time after the version time of the IMCU, a delete vector is made for the transaction by "rolling back" changes that occurred to the changed-row bitmap 606 after the snapshot-time of the transaction. For example, if a transaction has a snapshot time of T5, the database server searches the record of bit changes 608 to identify changes that occurred after time T5. A copy of the changed-row bitmap 606 is made, and within that copy the bits that correspond to the changes that occurred after time T5 are reset to "0". For transactions with snapshot times before the version time of the IMCU, the delete vector may be generated by making a copy of the changed-row bitmap 606, and within that copy setting to "1" the bits of rows that were changed between the snapshot time of the query and the version time of the IMCU.

Because delete vectors are transaction-specific, at any given time, five distinct transactions may be performing scans of the rows that map to a particular IMCU. Each of the five transactions may have been assigned a different snapshot-time. Consequently, each of the five transactions will have a different delete vector, though all five delete vectors are generated based on the same changed-row bitmap of the SMU that corresponds to the IMCU.

Post-Merge Retention of Pre-Merge Changed-Row Bitmaps

As mentioned above, when changes are merged into an IMCU, all values in the changed-row bitmap of the IMCU are reset to "0" to indicate that no rows have been changed since the new version time of the IMCU (which will be the time at which the IMCU is refreshed/merged). However, rather than simply discard or overwrite the existing changed-row bitmap, a copy of pre-merge changed-row bitmap may be saved. A saved copy of a pre-merge changed-row bitmap is referred to herein as a "retained bitmap". As shall be described in greater detail hereafter, such retained bitmaps allow a post-merge IMCU to be used to provide data items to transactions that have snapshot times before the merge.

For example, assume that an IMCU is constructed at time T1. From time T1 to time T10, the changes made to the data items in the IMCU are recorded in its global journal, rather than being made directly to the data items themselves within the IMCU. While those changes are being recorded within the journal, the changes are also causing corresponding bits to be set in the changed-row bitmap of the IMCU. At time T10, the changes are merged into the IMCU, causing the version time of the IMCU to change from T1 to T10.

Under these circumstances, the state of the changed-row bitmap immediately before the merger reflects which rows, within the IMCU had changed between time T1 and time T10. By indicating which rows had changed between time T1 and time T10, the changed-row bitmap likewise indicates which rows had not changed between time T1 and time T10. Within the post-merger IMCU, those rows that had not changed between time T1 and time T10 can be provided to transactions that have snapshot times between T1 and T10.

Specifically, a copy of the pre-merge version of the changed-row bitmap is retained after the merger. Along with the retained bitmap, the version timestamp of the pre-merge IMCU is also stored. In the example given above, the retained bitmap would be associated with the version timestamp of T1.

When a transaction (a) requires data items that map to an IMCU, and (b) has a snapshot time that falls between the retained bitmap time and the current IMCU time, the retained bitmap is used to identify the rows that were not changed between the retained bitmap time and the current IMCU time. Values for the identified rows may be provided to the transaction from the current IMCU. Values for the remaining rows are obtained elsewhere. Specifically, values for the remaining rows may be obtained from the global journal of the IMCU if the relevant journal entries have not yet been purged, or from the PF data.

IMCU Refresh Undo

Rather than store a single retained bitmap in response to the most recent merge, a separate retained bitmap may be stored in response to each merge. The retained bitmaps for a given IMCU may be linked in chronological order. The linked set of retained bitmaps for an IMCU constitutes an "IMCU refresh undo" for the IMCU.

For example, assume that an IMCU was created at time T1, and then refreshed/merged at times T10, T15 and T30. Under these circumstances, the IMCU refresh undo for the IMCU would contain three retained bitmaps RB1, RB2 and RB3. These three retained bitmaps would be associated with times T1, T10 and T15, respectively.

In the present example, the "0" bits of RB1 indicate the rows that were not changed between times T1 and T10. The "0" bits of RB2 indicate the rows that were not changed between the times T10 and T15. The "0" bits of RB3 indicate the rows that were not changed between the times T15 and T30.

Given any snapshot time, the IMCU refresh undo may be used to identify which rows, within the current IMCU can be provided to a transaction with that snapshot time. For example, for a transaction with the snapshot time T18, the "0" bits in RB3 would indicate which rows can be provided to the transaction from the current IMCU. As another example, for a transaction with the snapshot time of T12, RB2 and RB3 can be combined using a logical OR operation to produce a bitmap that indicates which rows can be provided to the transaction from the current IMCU. As yet another example, for a transaction with the snapshot time of T5, RB1, RB2 and RB3 can be combined using a logical OR operation to produce a bitmap that indicates which rows can be provided to the transaction from the current IMCU.

Thus, given a transaction with the snapshot time of TX, the retained bitmap with the highest timestamp that is below TX is combined, using a logical OR operation, with all more recent retained bitmaps of the same IMCU. The logical "OR" operation produces a bitmap where the "0"s correspond to rows that have not changed since TX and the version time of the current IMCU. Consequently, data items for those rows may be provided by the IMCU.

Transaction Downgrade Based on Memory Constraints

As mentioned above, changes made to items in an IMCU are recorded in journals rather than made directly to the items in the IMCU. The journals are maintained in volatile memory. Unfortunately, long-running transactions that make changes to large numbers of items may cause so many journal entries to be generated that there is insufficient room to store the entries in volatile memory.

Under these circumstances, the journal entries may be flushed to persistent storage to free up space in volatile memory. However, flushing the journal entries to persistent storage, and reading the entries from persistent storage thereafter, incurs a significant performance penalty. Therefore, according to one embodiment, transactions that are generating journal entries in sufficient quantity to cause memory issues are "downgraded".

According to one embodiment, such transactions are downgraded by pushing their existing private journal entries to the global journal of the IMCU, and ceasing to generate further private journal entries. Although in the global journal of the IMCU, such journal entries are not visible to other transactions because the journal entries are for an uncommitted transaction, and therefore initially associated with an "indeterminate" timestamp. When the downgraded transaction commits, the timestamps of the transaction's entries in the global journal are changed from indeterminate to the commit time of the transaction.

Rather than cease the generation of journal entries when in downgraded mode, transactions may continue to generate journal entries until the size of their private journal once again reaches the specified threshold. At that point, the private journal entries may once again be moved to the global journal, where the entries will not be visible to other transaction due to their indeterminate timestamp. This process of filling the private journal to a threshold, and then moving the entries to the global journal, may be repeated any number of times until the transaction either commits or is rolled back.

Regardless of whether a transaction that is operating in the downgraded mode continues to generate further private journal entries to record its changes, the changes are still recorded in the record of bit changes associated with the IMCU. Once the transaction commits, those bit changes are made to the changed-row bitmap.

By using the changed-row bitmap to record the fact that a change occurred, future transactions will avoid reading stale data items from the IMCU. When the changed-row bitmap indicates that data items associated with a particular row are invalid, transactions that require data items from that row must obtain the data items for a source other than the IMCU. In the case that the changes were made by a downgraded transaction that ceased generating journal entries, the changes will not appear in the global journal, so the data items are retrieved from the PF data.

In one embodiment, not all transactions that are using an IMCU are downgraded at once. Rather, the downgrades are performed on a per-transaction basis, where transactions are only downgraded if they satisfy certain criteria. The criteria may be, for example, that the amount of journal entries that they have generated exceeds a particular threshold.

In general, transactions must see the uncommitted changes that they have made themselves. Consequently, a downgraded transaction that has ceased generating journal entries may have to obtain the values of some data items that the transaction previously changed from the PF data, since no journal entry exists for those changes.

Maintaining Sync without Journals

In the sections above, it is explained that the MF data may be kept in sync with the PF data by recording changes in journals, while leaving the compressed MF data intact until the journals are merged into the compressed MF data. However, in an alternative embodiment, for one or more of the IMCUs, the MF data may be maintained in sync merely by invalidating the data in response to changes made to the corresponding PF data without using journals to record the changes.

In such an embodiment, delete vectors may be generated for a transaction, as described above. For those bits that are not set, the data may be obtained from the appropriate IMCU. For those bits that are set, the data must be retrieved from the PF data, since obtaining data from in-memory journals is not an option when no such journals are maintained.

The benefit of invalidating the MF data without recording the changes in journals is that the processing overhead and memory consumption of maintaining the journals is avoided. However, when data items in the IMCU are too stale to be used to process a transaction, accessing the appropriate version of the data items from the PF data will generally incur more overhead than would be required to obtain the data items from journals. In addition, refreshing the IMCUs in the absence of in-memory journals will also typically incur more overhead, because the changes that need to be merged into the IMCUs must be obtained from the PF data rather than from in-memory journals.

In some embodiments, journals may be maintained for some IMCUs, but not others. In addition, it is possible for the journal of an IMCU to be dropped, and yet continue to use the IMCU for data that has not been invalidated due to changes between the IMCU version time and the snapshot time of the transactions that require the data.

Determining from where to Obtain Data

Because MF data 104 is merely a mirror of some of the PF data (albeit in a different format), all data items contained in MF data 104 are also in the PF data. Therefore, for any query that requires access to data items that are mirrored in the MF data, the database server has the choice of obtaining that data from MF data 104, from the PF data, or partially from the MF data 104 and partially from the PF data.

In general, when the requested data is a row of a table, the location from which to most efficiently retrieve the data is cache 106 (assuming that the persistent format is row-major). If the requested row does not currently reside in cache 106, but the MF data 104 has all columns of the row, then MF data 104 is the location from which to most efficiently retrieve the row. Assuming that MF data 104 is column-major, MF data 104 is less efficient than cache 106 for retrieving a row because, in column-major format, the values for the row must be pieced together from various places within the MF data 104.

If not all of the data for the requested row is in the MF data 104, then at least some of the row must be retrieved from persistent storage 110. Typically, persistent storage 110 is the least efficient location from which to retrieve data, because disk accesses are significantly slower than operations on data stored in volatile memory.

According to one embodiment, the decision of where to the data may be made at any of numerous levels of granularity. For example, the decision of from where to obtain the data may be made on a per-table basis, a per-column basis, a per extent basis, a per segment basis, a per-table-partition basis, etc. Thus, even though all data from column c1 is in column vector 220, the database server may decide to execute a scan by obtaining some of the values of column c1 from column vector 220, and by obtaining the rest of the values of column c1 from the PF data on persistent storage 110.

According to one embodiment, database objects, such as tables, can be "in-memory enabled". A table that has been in-memory enabled has at least a portion of its data mirrored in the MF data. For example, table 200 is in-memory enabled because data from two of its columns (c1 and c3) are mirrored in mirror format data 104. Specifically, data from column c1 of table 200 is mirrored in column vector 220, and data from column c3 of table 200 is mirrored in column vector 222.

When a table is not mirror-enabled, a scan of the table is performed by reading PF data from cache 106 and/or from persistent storage 110. On the other hand, when a table is mirror-enabled, it may be also possible to get some or all of the table's data from MF data 104. More specifically, it may be possible to obtain data of a mirror-enabled table from any of the following locations:
   the persistently-stored PF data
   the locally cached PF data
   the PF data in the cache of another instance
   the locally stored MF data
   the MF data stored in the volatile memory of another instance
   the locally stored MF data updated with information from journals
   entirely from the journals
   MF data stored in the volatile memory of another instance updated with information from journals
   any combination of the above.

Further, the data can be obtained without the use of any indexes, with the use of conventional indexes on the PF data, and/or with the use of in-memory indexes. Further, indexes need not be used in conjunction only with the format based upon which the indexes were built. Thus, conventional indexes built on the PF data may be used to identify rows that must be retrieved, and then data for those rows may be retrieved from the MF data. Similarly, an in-memory index may be used to identify rows that must be retrieved, and some or all of those rows may be retrieved from the PF data.

According to one embodiment, a cost-based optimizer is used to determine, for any given database operation, which of the sources (or which combination of these sources) will be used to supply the data needed by the database operation. Additional factors used by the cost-based optimizer include whether conventional and/or in-memory indexes exist for quickly locating the desired data.

Scanning Operations

According to one embodiment, when it is determined that a table scan operation is to obtain at least some of the requested data from MF data 104, a determination is made as to whether the timestamp associated with the MF data 104 is earlier than the snapshot timestamp being used by the scan. In embodiments where the MF data 104 is contained in an IMCU, the determination is made by comparing the IMCU version time, stored in the SMU of the IMCU, to the snapshot time of the transaction associated with the table scan.

If the MF data timestamp is earlier than the snapshot timestamp being used by the scan, then is possible that some of the data in the IMCU is stale relative to that snapshot time. Under these circumstances, it is possible that the required versions of data items that are stale in the IMCU reside in the global journal of the IMCU or the private journal of the transaction. In this case, the journals associated with the IMCU may also be scanned to obtain the correct version of the data that is stale in the IMCU.

Referring to FIG. 6, assume that column vector 220 has the current version of all values from column c1 of table 200 as of time T1. However, at time T3, R3C1 was changed from X to Y. For R3C1, column vector 220 has the old value X, while journal 602 has the new value Y. Thus, when a table scan with a snapshot time of T5 uses IMCU 600 as a source for any of its data, both the compressed MF data in IMCU 600 and the global journal 602 of IMCU 600 are scanned.

In addition to scanning the global journal 602, the private journal of the transaction that is performing the scan is also scanned. For example, if the transaction performing the scan is TX1, then private journal 662 is also scanned.

Thus, any given table scan may involve scanning the compressed MF data in IMCU 600, scanning global and private journals (e.g. journals 602 and 662), and scanning the PF data (some of which may be in cache 106). Each of these scans can be performed independently and in parallel. Thus, in response to a query that requests values from columns c1 and c2 of table 200, the database server may, in parallel, (a) scan column vector 220 for values from c1, (b) scan journal 602 for updated values from c1, (c) scan journal 662 for updated values of c1, and (d) scan the PF data structures 108 to obtain the values for c2 of table 200.

Scanning Operation Example

Figure 7:
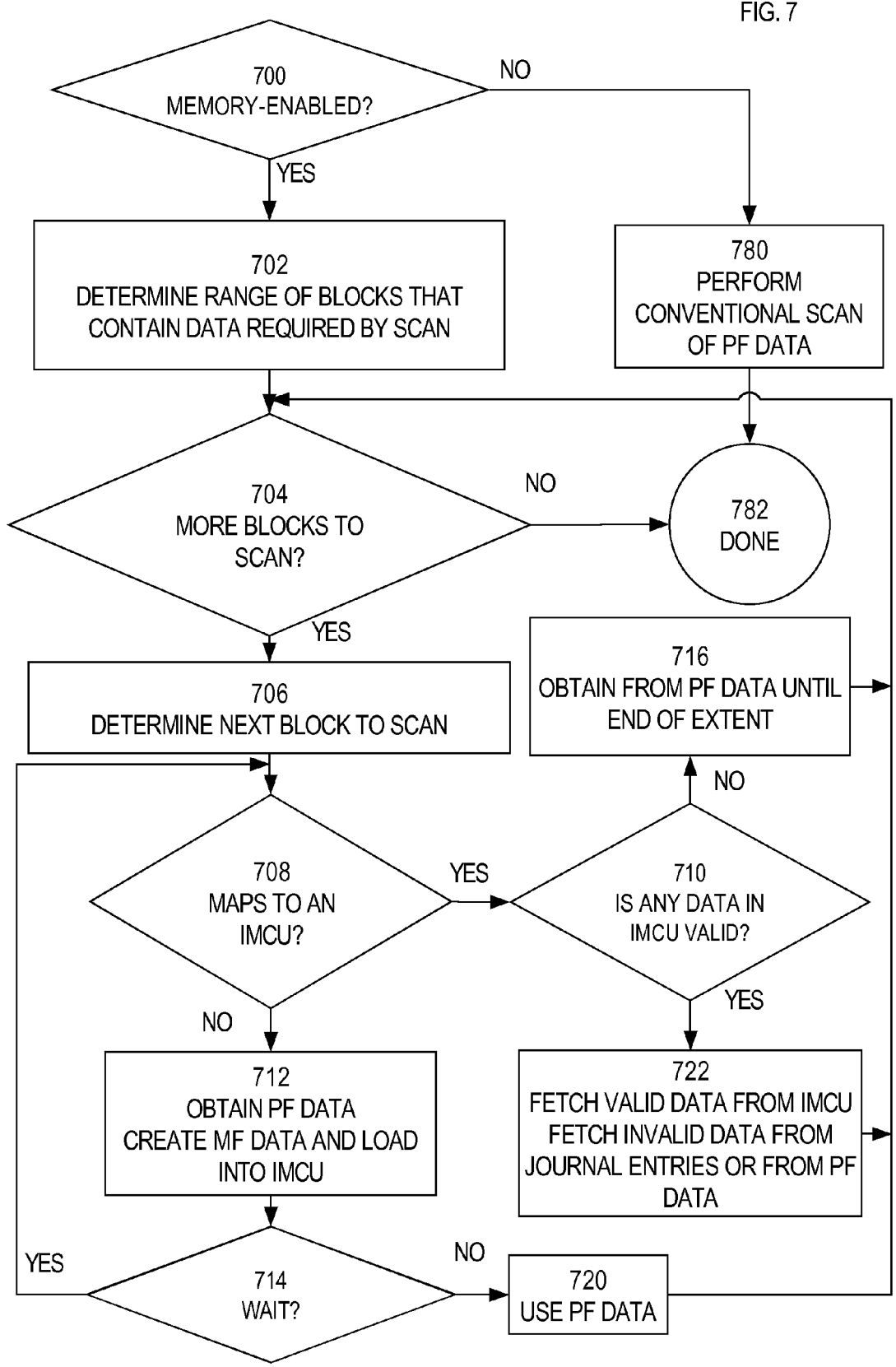
FIG. 7 is a flowchart illustrating steps for performing a scan operation, according to an embodiment.

Referring to FIG. 7, it is a block diagram of the steps performed by a database server in response to a request to scan a table. The table that is being scanned is split into segments, where each segment includes a set of extents, and each extent includes a set of blocks. In this context, database server determines which blocks contain data that needs to be scanned, and whether to scan the blocks from the PF data, or to obtain the data from the MF data.

Specifically, at step 700, the database server determines where the scan operation is "memory-enabled". An operation is "memory-enabled" if the operation is permitted to obtain some or all of the data it requires from the MF data. The scan operation may automatically be treated as memory-enabled, for example, if the table that is being scanned (the "target table") is designated as memory-enabled. A table is "memory-enabled" if data from the table is to be mirrored in the MF data. As described elsewhere, data items from a memory-enabled table maybe proactively loaded into IMCUs, or may be loaded into IMCUs on an on-demand basis. Even if the target table is designated as memory-enabled, a switch may be provided to designate the scan operation as either memory-enabled or not-memory-enabled. A scan operation may be designated as not-memory-enabled to force the scan to be executed against only the PF data.

According to one embodiment, the memory-enabled designation may be made at any of a number of levels of granularity. For example, the designation may be made on a per-table basis, a per-partition basis, a per-segment basis, or a per-extent basis. For the purpose of illustration, it shall be assumed that the memory-enabled designation is made at the per-extent basis.

Referring again to FIG. 7, if the scan is not memory-enabled, then control passes to step 780 and the scan is performed only against the PF data. After the PF data has been used to perform the scan, the scan operation is done (step 782).

On the other hand, if the scan operation is memory-enabled, then control proceeds to step 702. At step 702, the database server determines the range of blocks that contain data required by the scan. Once the range has been determined, control passes to step 704. For the purpose of illustration, it shall be assumed that blocks B1 to B500 contain the data required by the scan operation.

Step 704 is the beginning of a loop that iterates through each block in the range identified in step 704. If at step 704 it is determined that there are no more blocks to scan, then control passes to step 782 and the scan operation is done. If some blocks have not yet been scanned, than control passes from step 704 to step 706.

At step 706, the database server determines the next block, from the range identified in step 702, to scan. At step 708, it is determined whether the address of the block selected in step 706 maps to an IMCU. If the address maps to an IMCU, then the IMCU stores MF versions of at least some data items from the segment. If the IMCU stores MF versions of data items from the segment, then control passes to step 710. Otherwise, control passes to step 712, where the segment that includes the block is obtained from the PF data.

In one embodiment, upon obtaining the PF version of a segment that is mapped to an IMCU, the database server converts the segment into the in-memory format, and stores the MF data thus produced in the IMCU. Such an embodiment employs on-demand loading, which is described in greater detail hereafter. The conversion and loading of the data into the IMCU may take some time. Therefore, at step 714, the database server determines whether to wait for the data from the segment to be converted and loaded. If the database determines to wait, then the database server waits, and control passes to step 708 when the data from the segment has been converted and loaded into the IMCU. If the database server determines not to wait, the data items are obtained from the PF data (step 720), and control returns to step 704.

As mentioned above, control passes to step 710 when it is determined that the address of the block maps to an IMCU. When the address of the block maps to an IMCU, the IMCU contains an MF version of at least some of the data items in the block. However, the versions of the data items that are contained in the IMCU are not necessarily valid relative to the snapshot time of the scan. Therefore, at step 710, it is determined whether the version of those data items in the IMCU is valid for the transaction that is executing the scan. In one embodiment, determining whether the data in the IMCU is valid involves generating a delete vector for the scan operation based on the snapshot time associated with the scan operation, the changed-row bitmap of the IMCU, and the record of bit changes for the IMCU. As described above, the delete vector is a snapshot-specific bitmap where each set bit indicates that the row corresponding to the bit is invalid relative to the snapshot time.

If, at step 710, it is determined that no data items for the current block are valid in the IMCU, control passes to step 716 where data items are obtained from the PF data until the end of the current extent. Then control passes back to step 704.

If the IMCU has valid versions for at least some of the items, then control passes to step 722. At step 722, the data items for which the IMCU has valid versions are fetched from the IMCU. The data items for which the IMCU does not have valid versions are fetched either from entries in the global journal of the IMCU, or from the PF data. As explained elsewhere, various factors may affect the selection of the source from which to obtain data items. Such factors may include, for example, whether the PF disk block that stores the correct version of the data items currently resides in cache. It is possible that only a subset of the data in a segment is mapped to an IMCU. For example, it may be that only a subset of a table's columns are mapped to an IMCU. Under these circumstances, any data items in the segment that are required by the scan but not mapped to the IMCU must be obtained from the PF data.

If the private journal of the transaction performing the scan has updated versions of any of the data obtained from the IMCU or the global journal, those updated versions are provided in place of any version otherwise obtained. This ensures that the scanning transaction sees its own changes, even though those changes have not been committed.

Even when the delete vector indicates that the IMCU has valid data for all rows, the global journal is checked to identify rows that were inserted after the IMCU was created. If the journal does not contain the actual data items for those rows, then the rows are retrieved from the PF data. Similarly, the private journal of the transaction is checked for rows newly inserted by the transaction, and for data items that have been changed by the transaction.

After fetching all necessary data items, control passes from step 722 back to step 704. At step 704, the loop is repeated until data items required by the scan have been obtained, either from an IMCU, from journal entries, or from the PF data.

When to Create the MF Data

Before MF data may be used to satisfy a query, or to improve performance of a query whose results are ultimately obtained from the PF data, the MF data must be present in volatile memory. Unlike cache 106, mirror format data is not simply a copy of the data that is stored on persistent storage 110. Rather, because the mirror format is not based on the persistent format, volatile memory 102 is initially populated by (a) reading the PF data from persistent storage 110 and (b) converting the PF data thus obtained to the MF format.

The amount of overhead that is required to perform the PF-to-MF conversion will vary from situation to situation, based on how different the mirror format is from the persistent format. For example, if the persistent format is row-major disk blocks that have been compressed one way, and the mirror format is column vectors that are compressed another way, the amount of overhead required to perform the conversion may be extensive.

The decision about when to create the MF data may be based on a variety of factors. For example, if sufficient time is available at system start-up, all of the PF data that has been selected for mirroring may be pre-loaded into volatile memory 102 on start up. As mentioned above, loading the MF data involves reading the corresponding PF data from persistent storage 110 and then converting that PF data into the mirror format.

Pre-Loading the MF Data

In one embodiment, the MF data is pre-loaded into volatile memory at database system start up. The pre-loading may be performed, for example, by background processes before any database operation is executed against the memory-enabled data structures that contain the data items that will be mirrored by the MF data.

The MF data may be created one-IMCU at a time. In multi-instance environment, durably stored metadata may be used to determine which MF data is pre-loaded into which database instance. Such metadata may include, for example, a MF-data-to-IMCU mapping and an IMCU-to-instance mapping.

In a simple example, the MF-data-to-IMCU mapping may indicate that IMCU 402 is to store the column vector 220 for c1, and that IMCU 404 is to store the column vector 222 of column c3. The IMCU-to-instance mapping may indicate that IMCU 402 is to be loaded into the volatile memory 502 of instance 1, while IMCU 404 is to be loaded into the volatile memory 504 of instance 2. Based on these mappings, the MF data would be pre-loaded into volatile memory in the manner illustrated in FIG. 5b.

On-Demand Loading of MF Data

Rather than simply pre-load the MF data, some or all of the MF data may be generated at the time that the corresponding PF data is accessed by a database operation. For example, assume that database instance 1 is assigned to host the column vectors for columns c1 and c3 of table 200. Rather than construct and load those column vectors on start-up, database instance 1 may initially generate no MF data. Instead, the database instance 1 may wait until a database command requires a scan of table 200. Because no MF data has been created yet, the scan is performed based entirely on the PF data. During that scan, the values needed to construct the column vectors for c1 and c2 will be accessed. Therefore, the column vectors for c1 and c2 may be built at that time without incurring any additional disk accesses.

On-demand loading of MF data may be used in conjunction with pre-loading. For example, some of the MF data that is to be hosted on instance 1 may be created at the time instance 1 is started. Other portions of the MF data may be constructed at the time the data is accessed by queries.

In one embodiment, users may set configuration options to indicate which MF data to pre-load, and which MF data to load on-demand. In an alternative embodiment, the database server automatically determines which portions of the MF data are pre-loaded and which are loaded on-demand. In general, the more frequently a data item is used, the more likely the database server will automatically pre-load the data item into MF data so that even the first database operation that requires the data item has the option of obtaining the data from the MF data.

Persistent Storage of IMCU Images

As mentioned above, the MF data may be created on start-up, on-demand, or any combination thereof. In one embodiment, images of IMCUs may be periodically stored to disk. Such persistently-stored images may be used to re-populate volatile memory 102 with MF data after a crash. The image of any given IMCU will be current as of a "checkpoint time", which may be when the IMCU image was persistently stored. However, that checkpoint time may be before the time that the crash occurred. Consequently, between the checkpoint time of an IMCU image and the time of the crash, additional changes may have been made to the IMCU. Since those changes are not reflected in the stored image, the IMCU image may be stale.

To use an otherwise stale IMCU image, the IMCU image may first be loaded into volatile memory. The IMCU data thus loaded may be usable, in conjunction with durably stored undo information, for database commands that have snapshot times before the checkpoint time associated with the IMCU image. To be usable with database commands that have snapshot times after the checkpoint time, redo information that was durably stored for the associated PF data prior to the crash may be used to populate the stale journals of the IMCU image with journal entries for the changes that occurred after the checkpoint time of the IMCU.

Depending on how many changes were made after the checkpoint time and before the crash, reconstructing an IMCU using a stale persistently stored image of the IMCU may consume significantly less overhead than completely re-generating the IMCU data from the PF data.

Selecting which PF Data to Mirror

The decision of which PF data to mirror, and when to load it, may be based on a variety of factors. For example, if a system has an enormous amount of volatile memory 102, and a relatively small database, it may be desirable to mirror the entire database. Thus, all PF data would also be mirrored in the MF data. On the other hand, if there is a relatively small amount of volatile memory 102 relative to the size of the database, then it may be optimal to only mirror a very small fraction of the database.

Typically, when not all of the database is to be mirrored, the portion that is selected to be mirrored is based on which portion will most improve overall performance of the system. Typically, mirroring data that is used frequently will provide more benefit than mirroring data that is used less frequently. Thus, if one table, one column of a table, or one partition of a table is access more frequently than other data in the database, that table, column or partition may be selected to be mirrored in volatile memory 102. The selection of which portions of a database to mirror may be made at any level of granularity. For example, the selection may be made on a per-table basis, a per-column basis, a per extent basis, a per segment basis, a per-table-partition basis, etc.

Self-Verification

In systems that maintain MF data in addition to the PF data, multiple sources of the same data are available to process some queries. In the foregoing sections, it has been explained that when multiple sources of the same data are available, a database server may select from among the possible sources based on which source will result in the most efficient processing of the requested database operation.

However, rather than select one of the possible sources, a database server may alternatively execute the database operation, in parallel, against each of the two or more sources. For example, a query that selects data from column c1 of table 200 may be answered with MF data from column vector 220, or with PF data from PF data structures 108. Rather than select one or the other, the database server can execute the operation, separately and independently, against both sources. Once finished, the results produced by the various sources may be compared against each other. If the result sets do not match, then an error occurred during the processing of at least one of the operations.

The database server may take any number of possible actions when such an error is detected. For example, in one embodiment, an alert is generated to indicate the occurrence of the error. The alert may indicate what the discrepancy is between the two results sets. Instead of or in addition to generating an alert, the database server may perform additional debugging operations, including but not limited to re-executing the operation turning off or on different database features to determine the feature whose use produces the error.

When the results sets match, the user may have a greater degree of confidence that the results of the operation are accurate. Thus, parallel execution, by the same database instance, of the same operation against multiple sources of the same data (the MF data and the PF data) provides an on-the-fly "double check" to verify the result set of the operation.

Typically, the execution of the database operations against the two sources may be done in parallel, so that performing self-verification has little performance impact on the operation relative to performing the operation only on the PF data. According to one embodiment, self-verification may be enabled at a highly granular level. For example, self-verification may be enabled on a per-session basis. Thus, the additional overhead incurred by self-verification may be incurred in only those sessions a user wishes to "test" for accuracy.

Self-verification operations may also be initiated by the system itself. For example, rather than receive a request from an application to execute a database command, the database system may be configured to identify and select "critical" database commands from those that have already been executed by the database system. During periods of low use, the database server may execute one or more of those selected database commands in the background. The selected database commands are executed in self-verification mode to concurrently produce multiple copies of the result set, one based on the MF data and one based on the PF data. The result sets are compared to ensure that the result sets are identical. If not identical, an error message may be sent to a user and/or recorded in a log. If identical, data may be stored to indicate that the selected database command passed a self-verification test. After passing a threshold number of tests (where the threshold may be 1), the database server may be configured to cease to select the database command for automated background self-verification.

In one embodiment, rather than simply generate an alert when a self-verification test fails, the database command is repeatedly retested under different conditions. To ensure that the repeats of the operation are as similar as possible to the original operation that produced the self-verification error, the same database operation may be executed with the same snapshot time as was used during the session that encountered the error.

In many database systems, numerous advanced query processing features may have virtual "on-off" switches, where the default state is "on". During the repeats of a previously-failed self-verification test, those features may be selectively turned on and off. If the self-verification passes when a particular feature is turned off, and fails when the same particular is turned on, then there is a likelihood that the error is related to that feature.

Having determined that use of a particular feature causes a self-verification problem with a particular database operation, a quarantine may be enforced. The scope of the quarantine may vary. For example, the database server may automatically turn off the particular feature for all future database commands, for all future database commands that target the same data as the database operation that encountered the error, or for only future executions of the specific database command that encountered the error.

IMCU Creation and Refresh Management
Overview

In an embodiment, database system 100 creates and refreshes IMCUs using one or more background processes. The IMCU management background processes are implemented in a transaction layer, with support from a space layer, of the database system 100. These background processes may be performed on a database server instance-level basis or on a database-level basis. The description herein is made in the context of an in-memory columnar database system. However, in alternative embodiments, the background processes described herein are also applicable in columnar database systems in general or non-in-memory columnar database systems.

Figure 9:
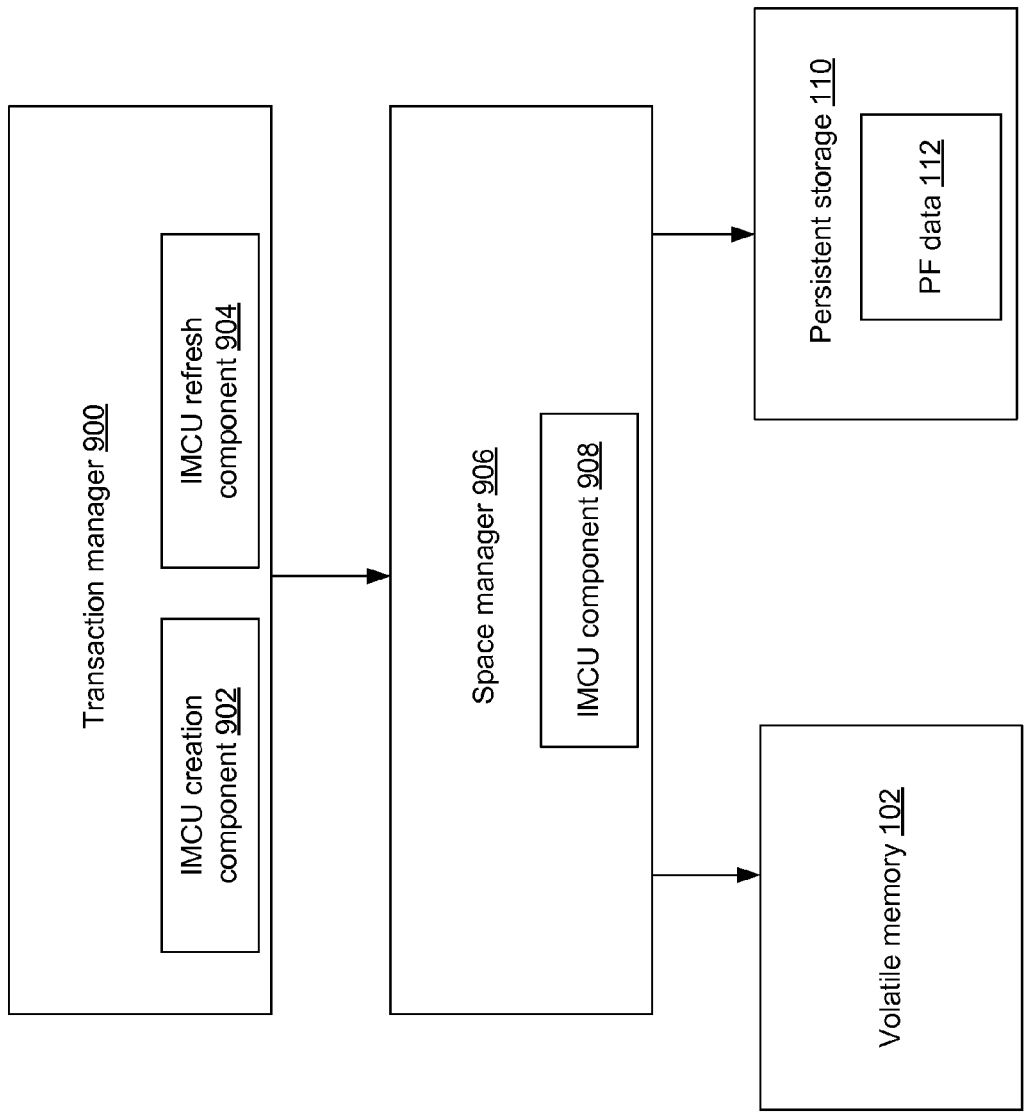
FIG. 9 is a block diagram illustrating additional details of the system of FIG. 1 for performing IMCU creation and refresh techniques, according to an embodiment.

FIG. 9 is an example block diagram illustrating a subsystem of database system 100 for managing IMCU creation and refresh, according to an embodiment. The subsystem includes a transaction manager 900 in communication with a space manager 906, and the space manager 906, in turn, in communication with each of at least a portion of the volatile memory 102 and persistent storage 110. As described in detail below, the transaction manager 900 is configured to enable processes that are responsible for creating and refreshing IMCUs such as described above. Transaction manager 900 and space manager 906 may be associated with an instance of the database server 120. Transaction manager 900 transactionally updates MF data (e.g., controls the IMCU background creation and refresh processes) as well as transactional updates to PF data. The transaction manager 900, also referred to as a transaction layer, interacts with the space manager 906, also referred to as a space layer, to implement the IMCU background processes.

The transaction manager 900 includes an IMCU creation component 902 and an IMCU refresh component 904. The space manager 906 includes an IMCU component 908. Components 902, 904, and 908 comprise one or more software components, programs, applications, instructions, or other units of code base configured to be executed by one or more processors included in the system 100 to perform IMCU creation and refresh functionalities. Components 902, 904, 908 are provided in non-transitory computer or machine readable storage media. Although three components are shown in FIG. 9, more or fewer than three components may be implemented to perform the IMCU creation and refresh functionalities described herein.

When an IMCU is to be created and stored in the volatile memory 102, the IMCU creation component 902 of the transaction manager 900 makes a space request to the space manager 906. In response, the space manager 906 provides service(s) to the transaction manager 900 to allocate appropriate space in the volatile memory 102 and otherwise facilitate creation and storage of a new IMCU within volatile memory 102. When an IMCU is to be refreshed with current data, the IMCU refresh component 904 similarly makes a space request to the space manager 906 to facilitate implementing the refresh. The services provided by space manager 906 may be exposed to transaction manager 900 as application programming interfaces (APIs) or through other provided interfaces that are accessible between layers or engines of the system 100.

IMCU Creation

Figure 10:
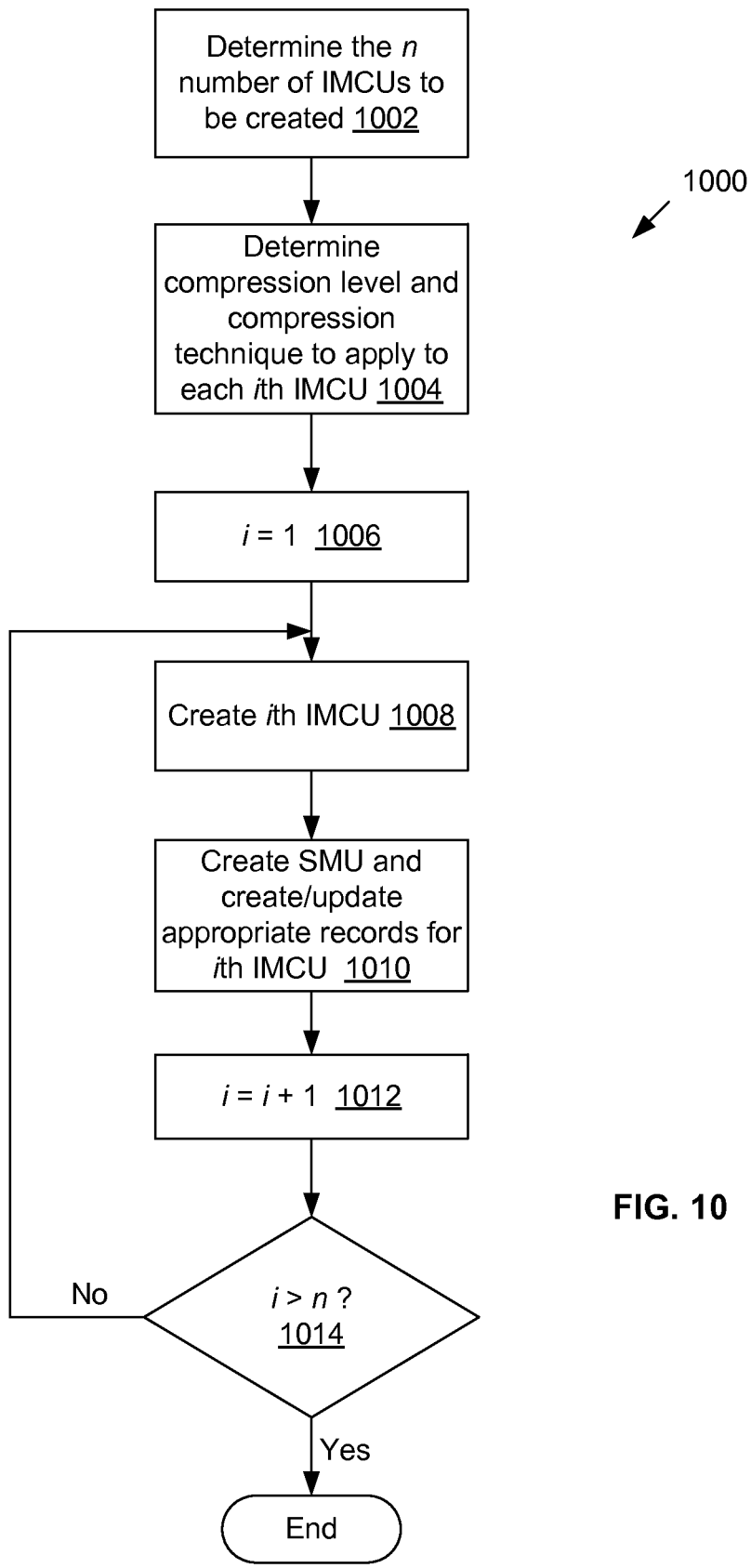
FIGS. 10-12 are flow diagrams illustrating example IMCU creation and refresh techniques, according to an embodiment.

FIG. 10 is an example flow diagram 1000 illustrating creation of one or more IMCUs according to an embodiment. One or more new IMCUs may be created upon system start up, as part of system failure recovery, on an on-demand basis, or any combination thereof.

The IMCU creation component 902 of transaction manager 900 initiates IMCU creation by making a space request to the space manager 906. The space request includes, among other things:

identification of the set of blocks of the PF data 112 in the persistent storage 110 to use for IMCU creation, and a particular snapshot time that indicates the version of the data that is to be used to populate the one or more IMCUs that are being created (also referred to as a particular or identified committed version of the system).

In response to the space request, the space manager 906 queues a plurality of tasks to create one or more IMCUs. According to one embodiment, the plurality of tasks are implemented within a task-driven background slave process framework (KTSJ) provided by the space manager 906. The plurality of tasks may include a coordinator task that monitors and manages the remaining or subordinate tasks. The remaining or subordinate tasks are referred to herein as IMC tasks. Alternatively, the coordinator task may be implemented in a dedicated background process that is separate from the KTSJ framework tasks. The coordinator task's responsibilities may include, but are not limited to, the following:

queue IMC tasks to KTSJ process framework;
    monitor memory usage;
    monitor IMC tasks;
    restart failed IMC tasks;
    degrade or shrink an IMCU in response to memory constraints; and/or
    keep record file(s) up to date with latest statistics.

In an embodiment, the coordinator task queues IMC tasks to the KTSJ framework to run on available pools of processes. Example IMC tasks include, but are not limited to:

determine how many IMCUs are needed for a given object (e.g., table, table partition, table sub-partition) and schedule the creation of each IMCU;
    create an IMCU that represents one or more on-disk extents;
    create an IMCU from row-major transaction journal store;
    recreate an existing IMCU at a higher compression level (due to memory constraints); and/or
    delete an IMCU.

IMC tasks comprise one or more different types of tasks (e.g., analyze task type, load task type). According to one embodiment, each task type has a separate task queue. Although a first task and a second task may be in separate task queues because they are different types of tasks from each other, there may still be coordination between the first and second tasks, such as performing the first task before the second task or the first task initiating the second task. At least the coordinator task and IMC tasks are embodied by the IMCU component 908, according to an embodiment.

In block 1002 of FIG. 10, the IMCU component 908 determines the number of IMCUs to create based on the space request from the IMCU creation component 902. The space request specifies the data object (also referred to as an on-disk object, on-disk data object, or persistent database object) to mirror in the one or more IMCUs. The data object may be any one of: a table, a table partition, a table sub-partition, one or more segments, a set of segments, one or more extents, a set of extents, a set of block of data, one or more columns of a table, one or more on-disk extents, or other set of PF data stored in the persistent storage/memory 110. A segment is a collection of extents, and an extent may is a contiguous chunk of storage. For example, an extent may correspond to a specific number of bytes of physical storage space.

For the purposes of explanation, it shall be assumed that the data object is populated with PF data organized in a row-major format containing one or more columns. Based on the specified set of blocks of the PF data 112 to load into an IMCU(s), component 908 determines how many IMCUs are needed. In addition to figuring out the n number of IMCUs needed, if more than one IMCU is to be created, component 908 also determines the allocation of subsets of the specified set of blocks of the PF data 112 among the n number of IMCUs. Each of the subset allocation comprises a range table of on-disk extents, a block range, a chunk, or a particular list of extents and sizes (the number of blocks in each extent) of the specified set of blocks of PF data. For example, the subset allocation may be denoted by a range of rowids or starting rowid identified in the specified set of blocks of the PF data 112. Space within an in-memory area (e.g., volatile memory 102) may be correspondingly allocated to IMUCs in units of in-memory extents.

An IMCU may also be referred to herein as a data object, in-memory data object, in-memory object, or the like. An IMCU may transparently inherit features that are applicable to the on-disk data object, such as SQL query-ability, parallel query, DMLS, and DDLs. As discussed in greater detail below, an IMCU includes data (e.g., MF data 104) organized in a column-major format.

In block 1004, the component 908 determines applicable compression for each ith IMCU, for which i=1 to n. For example, the level of compression (e.g., low, medium, or high) and which compression technique or format to use for each column. As another example, the applicable compression may comprise not applying any compression for a given IMCU.

Then, for each ith IMCU, blocks 1008-1010 are carried out to create the ith IMCU. FIG. 10 depicts serial creation of IMCUs for illustration purposes and to simplify describing the present disclosure. Although FIG. 10 depicts serial creation of IMCUs, blocks 1008-1010 may alternatively be duplicated for parallel creation of more than one IMCU at the same time. Additionally, even for a given ith IMCU, block 1010 may be performed prior to, simultaneously with, or after block 1008.

Figure 11:
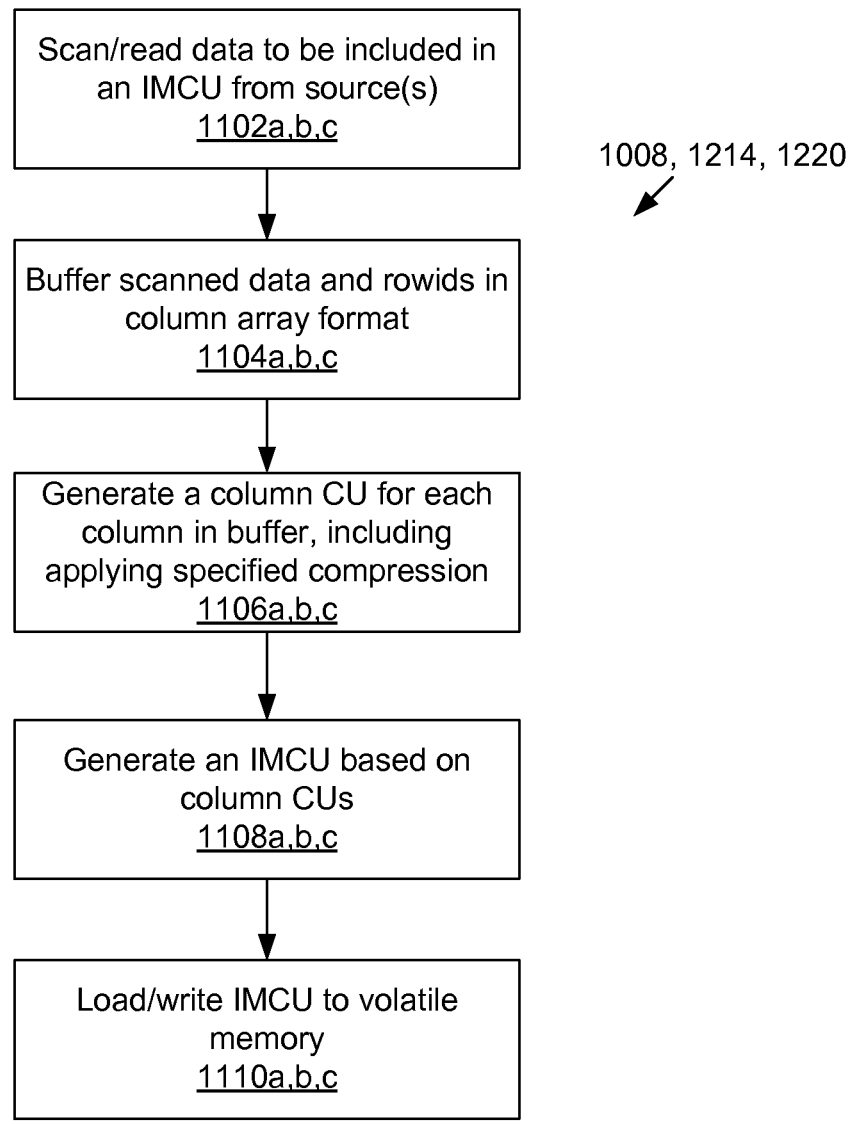

As an example, for i=1 in block 1006, the first IMCU of the n number of IMCUs is created. In block 1008, the IMCU component 908 creates the ith IMCU using the data corresponding to the ith specified extent and size list from the on-disk or persistent storage 110 at the identified committed version of the system. Additional details of block 1008 are illustrated in FIG. 11, according to an embodiment. In block 1102a of FIG. 11, the IMCU component 908 initiates a scan of the PF data 112 to be mirrored in the ith IMCU from on-disk or persistent storage 110. The particular PF data 112 to be scanned/read comprises the data corresponding to the ith extent and size list at the identified committed version of the system. Typically the committed version of the system should be as current as possible. The row header pointer is used to fill in the length, column values, and column null specification arrays. The rowids corresponding to the scanned rows are also obtained.

Next, in block 1104a, the data and rowids returned from the scan in block 1102a are buffered in a column array format. The buffered information may be stored in a buffer or cache of a System Global Area (SGA), which comprises a group of shared memory structures that contains data and control information for a database instance. Alternatively, the buffered information may be stored in volatile memory 102 or persistent storage 110 if a separate buffer or cache is not available.

The buffered information organized in a column array format is used to generate a column compression unit (CU) or column vector for each column of the scanned rows buffered in block 1106a. In generating each column CU, compression specified in block 1004 of FIG. 10 is applied to the column values. Each generated column CU may be initially stored in a private Program or Process Global Area (PGA) memory of the system 100 (e.g., a non-shared RAM memory region that is accessible exclusively by a database server process that created the memory region).

In block 1108a, all of the column CUs are assembled together, taking into account any alignment restrictions of the column CUs, to form the ith IMCU. One or more of the column CUs may have different alignment restrictions, and as such, an indication of how the column CUs should be aligned relative to each other is also provided by block 1106a. Alignment restriction associated with a column CU may comprise, for example, alignment at a register width boundary to enable vector processing for fast scans.

Lastly, in block 1110a, the set of assembled column CUs in block 1108a is loaded or written to volatile memory 102 as the ith IMCU.

In some embodiments, if the space allocated in volatile memory 102 is less than the amount requested, the ith IMCU may be split into constituent IMCU pieces, each containing one or more complete column CUs, and the constituent IMCU pieces may be loaded to volatile memory 102.

Returning to FIG. 10, in block 1010, the IMCU component 908 creates an SMU corresponding to the ith IMCU created in block 1008 as well as updating and/or creating appropriate record file(s) to reflect the particular IMCU creation and state. As an example, if the IMCU created in block 1008 comprises IMCU 600 shown in FIG. 6, then the SMU created and stored in volatile memory 102 for the created IMCU may comprise SMU 604 also shown in FIG. 6.

Once the ith IMCU and associated recordkeeping details are complete, creation of the next IMCU may occur by incrementing i in block 1012. In block 1014, a check is performed as to whether all n IMCUs have been created. If less than all n IMCUs have been created (no branch of block 1014), then flow diagram 1000 returns to block 1008 to create the next IMCU. If all n IMCUs have been created (yes branch of block 1014), then flow diagram 1000 ends.

An example of two IMCUs 402, 404 created for a given on-disk data object, a table 200 in FIG. 2A, is shown in FIG. 4. MF data corresponding to the PF data included in the table 200 are maintained, within volatile memory 102, in IMCUs 402, 404. Each of the IMCUs stores a different set of MF data. In FIG. 4, IMCU 402 stores half of each of columns c1 and c3 (see FIG. 2A), and IMCU 404 stores the other half of columns c1 and c3. In particular, IMCU 402 includes column vectors 420 and 422 corresponding to half of each of columns c1 and c3, respectively, and IMCU 404 includes column vectors 424 and 426 corresponding to the other half of columns c1 and c3, respectively. IMCUs 402, 404 divide the MF data stored therein based on, for example, the rows (or rowids) to which the data belongs in persistent storage 110. IMCU 402 is allocated rows r1 to r3 of table 200, and IMCU 404 is allocated rows r4 to r6 of table 200.

IMCU Refresh

Each of the existing IMCUs in the system 100, including the n IMCUs created above, is monitored by the IMCU refresh component 904 starting immediately or nearly immediately after creation. In an embodiment, each of the IMCUs is individually and independently monitored relative to each other for a potential refresh operation. As discussed above, although the MF data contained within a given IMCU can be implicitly kept in sync with updates to the corresponding PF data via use of journals and changed-row bitmaps, over time the journal entries may become too numerous (indicative of too many updates to the MF data) or the inefficiency associated with reconciling numerous invalid MF data in a given IMCU with updated data indicated in the journal entries outweighs other ways of obtaining the desired data.

Figure 12:
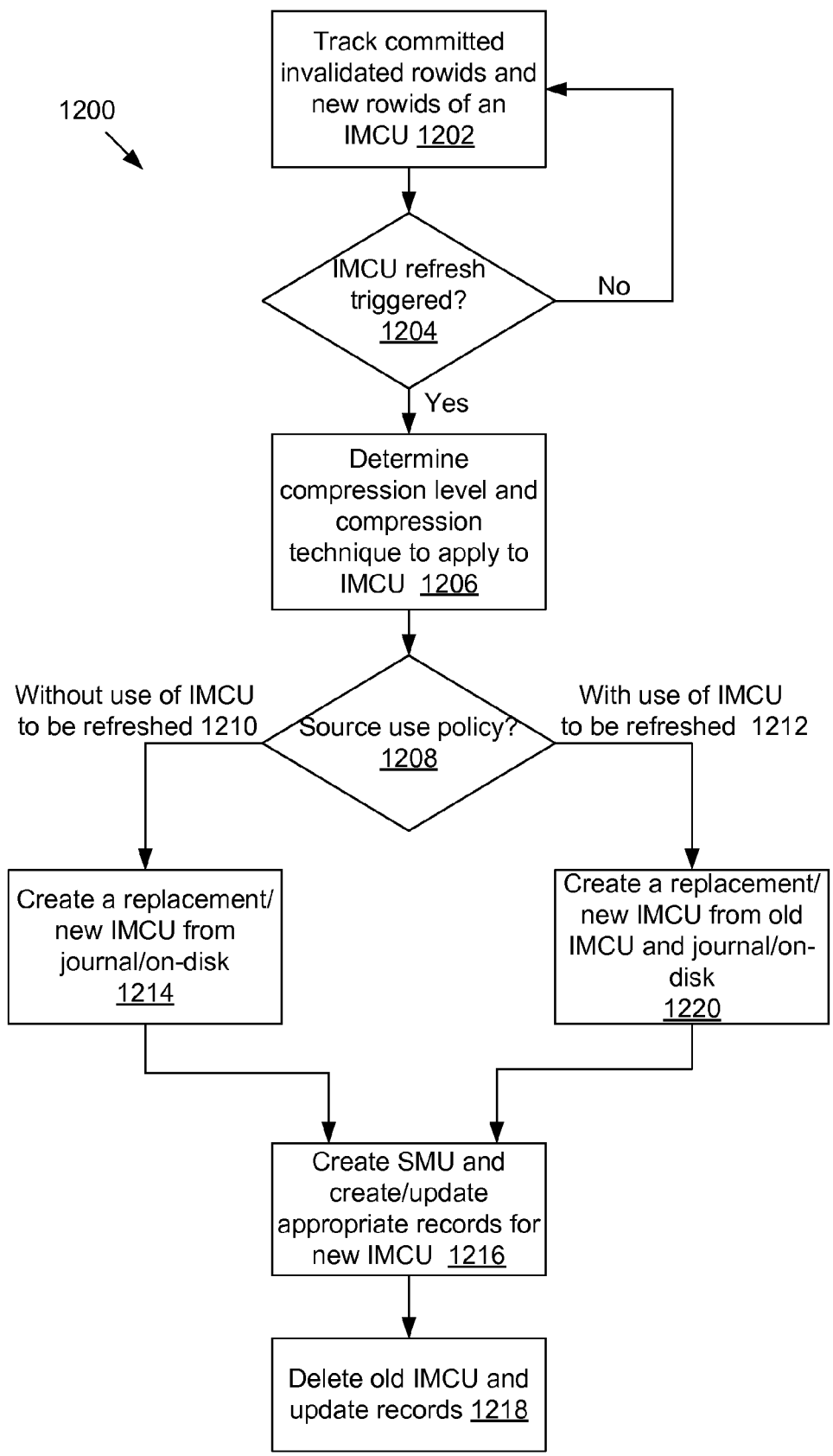

FIG. 12 illustrates an example flow diagram 1200 for performing automatic IMCU refresh techniques according to an embodiment. Flow diagram 1200 sets forth techniques for refreshing or updating an existing IMCU automatically and independently of other IMCUs. This is the case even though a given journal may be associated with more than one IMCU, or conversely, more than one journal may be associated with a given IMCU. For example, a single set of journal extents may be used to maintain an indication of which rows are invalid for at least a first IMCU and a second IMCU collectively containing data located in the same block range as an on-disk data object.

The automatic IMCU refresh techniques described herein are also performed as background processes, similar to the IMCU creation process discussed above. Because each IMCU is refreshed independently of each other and a plurality of IMCUs may exist within the system 100 at any given time, the operations of flow diagram 1200 may occur in multiple implementations at the same time, one implementation for each of the existing IMCUs. However, for ease of discussion, automatic refresh techniques for a given IMCU are discussed below.

In block 1202, the IMCU refresh component 904 automatically tracks or monitors the transaction committed invalidated rowids of a given IMCU and/or the transaction committed non-IMCU new rowids in the journal associated with the given IMCU. The transaction committed non-IMCU new rowids in the journal comprise one or more new rows that are within the given IMCU's data block range but which came into existence after the given IMCU was created, and thus, not included in the given IMCU. The IMCU refresh component 904 keeps track of the number of these committed invalidated and/or new rowids (also referred to as committed invalidated rows or committed invalidated/new rows) at least once for each relevant IMCU block range when a transaction commits.

Next in block 1204, the IMCU refresh component 904 compares the number of committed invalidated rows of the given IMCU against a refresh trigger condition or threshold. A refresh triggering condition may be if the number of committed invalidated rows of the given IMCU equals or exceeds a pre-set committed invalidated row count threshold. An example of the pre-set committed invalidated row count threshold may be 1000. Another refresh triggering condition may be if the number of committed invalidated rows of the given IMCU equals or exceeds a pre-set percentage threshold. Ten percent may be an example pre-set percentage threshold. Still another example of a refresh triggering condition comprises whether the number of committed new rows associated with the given IMCU equaling or exceeding a pre-set threshold value, such as 10,000.

If the refresh trigger condition is not satisfied (no branch of block 1204), then the flow returns to block 1202 to continue tracking the committed invalidated rows of the given IMCU. If the refresh trigger condition is satisfied (yes branch of block 1204), then a refresh of the given IMCU is automatically triggered or initiated by IMCU refresh component 904.

In an embodiment, existing IMCUs, including the given IMCU for which refresh operation will be applied, are not updatable or changeable after creation. Thus, refreshing the given IMCU comprises creating a replacement IMCU for the given IMCU, the replacement IMCU populated with data in the same block range as the given IMCU but more current than the data in the given IMCU. Refreshing a given IMCU comprises recreating the given IMCU with updated data. To this end, refresh operations share similarities with creation operations discussed above in conjunction with FIGS. 10 and 11.

The IMCU refresh component 904, alone or in conjunction with IMCU creation component 902, makes a space request to space manager 906 to start background processes associated with creating a replacement IMCU for the given IMCU. In response, in block 1206, the IMCU component 908 of space manager 906 determines an applicable compression level (e.g., low, medium, or high) and the particular compression technique or format to use for each column of the replacement IMCU, similar to the discussion above for block 1004 of FIG. 10. Alternatively, the applicable compression for the replacement IMCU may be not applying any compression at all.

Next in block 1208, the IMCU component 908 checks, accesses, or otherwise confirms which source(s) of data to use in creating the replacement IMCU. In an embodiment, the space request from the IMCU refresh component 904 may specify not to use data in the given/existing IMCU to create the replacement IMCU. In another embodiment, the space request may specify using data in the given/existing IMCU (e.g., data in the valid rows of the given IMCU) to create the replacement IMCU. In still another embodiment, a source use policy may be pre-defined and the IMCU component 908 performs processes consistent with the pre-defined policy. In another embodiment, the default policy may be if an IMCU already exists for the same block range, to reuse valid/unchanged rows of data from this IMCU rather than from on-disk or persistent storage 110.

If no data from the existing/given IMCU is to be used in refreshing the given IMCU (branch 1210), then the replacement IMCU is created from data sourced from the journal associated with the given IMCU and the on-disk/persistent storage 110. IMCU component 908 creates the replacement/new IMCU using these data sources in block 1214. Additional details regarding creation of the replacement/new IMCU are provided in FIG. 11. Blocks 1102b, 1104b, 1106b, 1108b, and 1110b of FIG. 11 are performed to create the replacement IMCU for the given IMCU. Blocks 1102b, 1104b, 1106b, 1108b, and 1110b are similar to respective blocks 1102a, 1104a, 1106a, 1108a, and 1110a as discussed above, except the source(s) from which data is read to generate the replacement/new IMCU.

In block 1102b, the IMCU component 908 initiates a scan of the data to be mirrored in the replacement/new IMCU from the journal associated with the given IMCU and the on-disk/persistent storage 110. In an embodiment, for the invalidated and new rows of the given IMCU, replacement or updated data corresponding to such rows are read from the journal; and for the valid or remaining rows of the given IMCU, corresponding data is read from the on-disk/persistent storage 110. Alternatively, all of the data to populate the replacement/new IMCU may be read from the on-disk/persistent storage 110. In any case, the version of the data scanned/read from the journal and on-disk is the most current as possible committed version of the system. Or at least the scanned version is a more current version of the committed version of the system than the version used to create the given IMCU.

Additionally, in some embodiments, an IMCU created from a journal may differ from an IMCU created from an on-disk extent list on that the journal derived IMCU may encompass rows from the entire table rather than a subset of the table. The journal derived IMCU may also include additional transaction metadata columns for use by the scan logic.

Upon loading or writing the replacement/new IMCU to volatile memory 102 in block 1110b, the refresh technique returns to block 1216 of FIG. 12. Block 1216 is similar to block 1010 of FIG. 10, in which IMCU component 908 creates an SMU, or updates the existing SMU, corresponding to the replacement/new IMCU as well as updating and/or creating appropriate record file(s) to reflect the particular replacement IMCU's creation and state.

With the replacement IMCU in place, the IMCU component 908 deletes the given IMCU, also referred to as the old, previous, or "dirty" IMCU, from the volatile memory 102, in block 1218. Relevant record file(s) are correspondingly updated to reflect the deletion. In alternative embodiments, block 1218 may comprise retaining the old IMCU, although relevant record file(s) may be updated to reflect that the old IMCU has been refreshed via the creation of the particular replacement IMCU.

If the refresh includes use of data in the existing/given IMCU (branch 1212), then the replacement IMCU is created from data sourced from the existing/given IMCU, and from the journal associated with the given IMCU or the on-disk/persistent storage 110. IMCU component 908 creates the replacement/new IMCU using these data sources in block 1220. Additional details regarding creation of the replacement/new IMCU are provided in FIG. 11. Blocks 1102c, 1104c, 1106c, 1108c, and 1110c of FIG. 11 are performed to create the replacement IMCU for the given IMCU. Blocks 1102c, 1104c, 1106c, 1108c, and 1110c are similar to respective blocks 1102a, 1104a, 1106a, 1108a, and 1110a as discussed above, except the source(s) from which data is read to generate the replacement/new IMCU.

In block 1102c, the IMCU component 908 initiates a scan of the data to be mirrored in the replacement/new IMCU from two or three sources. In an embodiment, the valid rows of the given IMCU are read to obtain still-current data, and the replacement or updated data corresponding to the invalidated and new rows of the given IMCU are read from the journal associated with the given IMCU. In another embodiment, the valid rows of the given IMCU are read to obtain still-current data, and the replacement or updated data corresponding to the invalidated and new rows of the given IMCU are read from the on-disk/persistent storage 110. In still another embodiment, the valid rows of the given IMCU are read to obtain still-current data, and the replacement or updated data corresponding to the invalidated and new rows of the given IMCU are read from a combination of the journal and the on-disk/persistent storage 110. In any case, the version of the data scanned/read from the journal and on-disk is the most current as possible committed version of the system. Or at least the scanned version is a more current version of the committed version of the system than the version used to create the given IMCU.

Additionally, in some embodiments, an IMCU created from a journal may differ from an IMCU created from an on-disk extent list on that the journal derived IMCU may encompass rows from the entire table rather than a subset of the table. The journal derived IMCU may also include additional transaction metadata columns for use by the scan logic.

Upon loading or writing the replacement/new IMCU to volatile memory 102 in block 1110c, the refresh technique returns to blocks 1216 and 128 of FIG. 12 to complete refreshing the given IMCU.

Note that because new row(s) within the block range of the given IMCU may exist at the time of refresh, the new IMCU that is created to replace the given IMCU in blocks 1214 or 1220 may contain, not only changed or updated MF data, but also more MF data than the previous/old IMCU. Conversely, it may also be possible for existing row(s) within the block range of the given IMCU have been deleted since the given IMCU was created, so that less MF data may populate the new IMCU. This may be the case even without taking into account the impact of compression or a particular compression technique applied to the data in the overall size of the new IMCU. Thus, the new IMCU created to refresh the corresponding given/existing/old IMCU may be the same or different size relative to each other, in addition to the MF data therein being changed or updated relative to each other.

Continuing the example above of IMCUs 402, 404 created in FIG. 4, if, for example, the state of the committed invalidated rows and new rows of IMCU 402 is such that a refresh is triggered, then only a portion of column c1 and/or c3 is refreshed rather than the entire column c1 and/or c3. The portion of column c1 and/or c3 that is refreshed is that portion allocated to IMCU 402, namely the column portion(s) corresponding to rows r1 to r3. Notice that just a portion of columns c1 and/or c3 can be refreshed independently of the rest of the portions of columns c1 and/or c3 by virtue of the column values for a given column being stored in different IMCUs and because IMCUs are refreshed independently of each other.

Accordingly, in-memory data objects or data objects organized in column-major format are created and refreshed by background processes of a database system (e.g., relational database management system (RDMS)) according to some embodiments. Creation and refresh techniques described herein do not impact online transaction processing (OLTP) performance or foreground processes, such as querying operations. There is also no need for a maintenance window to maintain the in-memory data objects over time. Among other things, because a persistent data object or data object organized in row-major format may be mirrored in a plurality of the in-memory data objects, each of the plurality of in-memory data objects containing different data from each other, the mirrored data is maintained in a granular and individualized manner. In an embodiment, each of the in-memory data objects is automatically refreshed independently of each other. A refresh of a particular in-memory data object is automatically triggered based on some threshold of invalidated rows associated with the particular in-memory data object. The refresh independence among the plurality of in-memory data objects is enabled even when a record file is associated with more than one in-memory data object, the record file tracking or logging all changes to data included in each of the more than one in-memory data object since the respective creation of each of the more than one in-memory data object.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
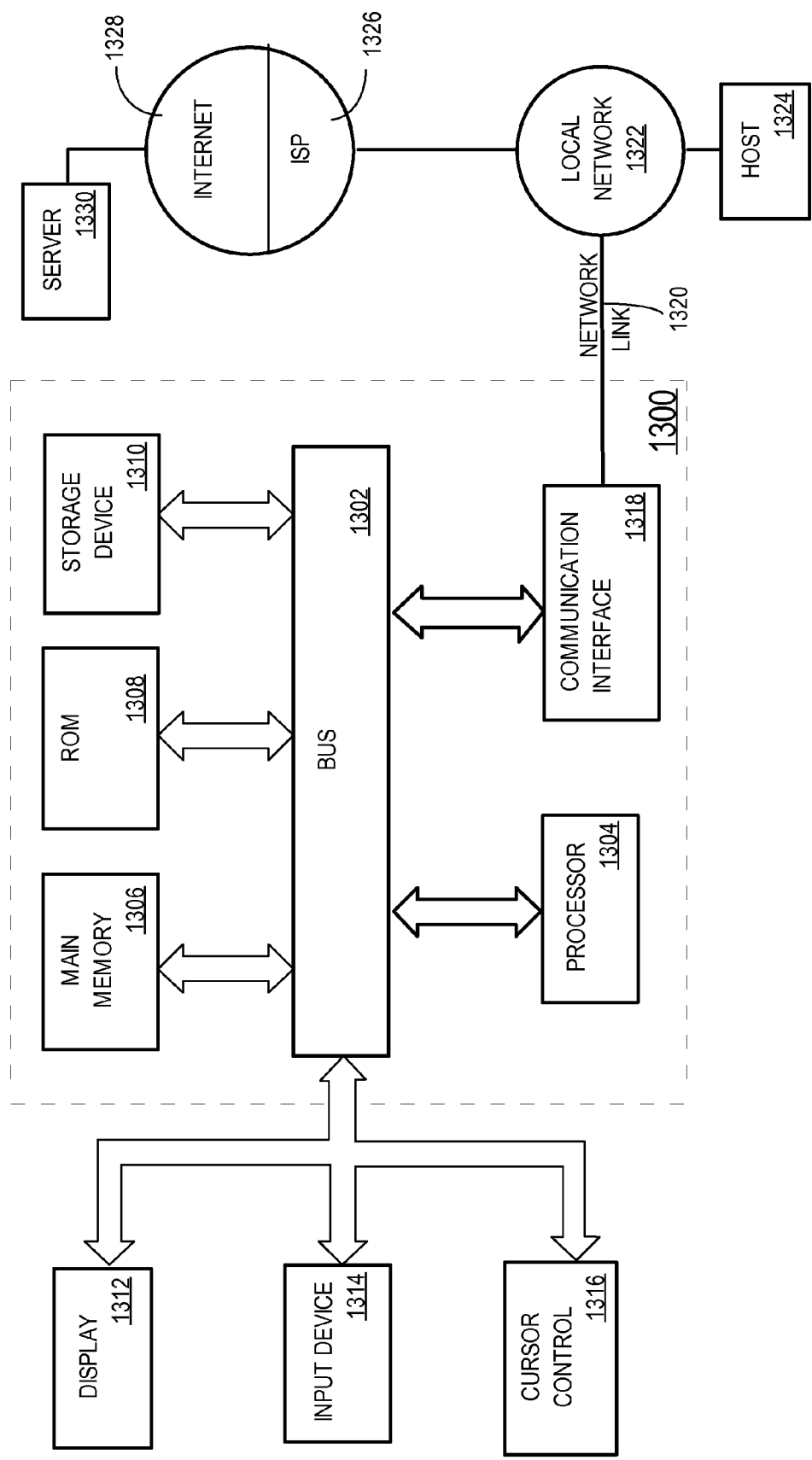
FIG. 13 is a block diagram illustrating a computer system that may be used to implement the techniques described herein.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT) or liquid crystal display (LCD), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328.

Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining a particular data object that contains particular data formatted different from column-major format, wherein the particular data includes first data and second data;
   maintaining a first data object that contains the first data organized in the column-major format;
   maintaining a second data object that contains the second data organized in the column-major format;
   in response to changes being committed to the first data in the particular data object, invalidating one or more rows of the first data object;
   in response to refresh criteria being satisfied relative to the first data object, automatically performing a refresh operation on the first data object independent of any refresh operation on the second data object;
   in response to changes being committed to the second data in the particular data object, invalidating one or more rows of the second data object; and
   in response to refresh criteria being satisfied relative to the second data object, automatically performing a refresh operation on the second data object independent of any refresh operation on the first data object.

2. The method of claim 1, wherein a single set of journal extents is used to maintain an indication of which rows are invalid for both the first data object and the second data object.

3. The method of claim 1, wherein maintaining the particular data object comprises maintaining the particular data object formatted in row-major format in a persistent storage, and wherein maintaining the first data object comprises maintaining the first data object in a volatile memory.

4. The method of claim 1, wherein the particular data object comprises at least one of a table, a table partition, a table sub-partition, one or more segments, a set of segments, one or more extents, a set of extents, a set of block of data, one or more columns of a table, one or more on-disk extents, or a set of data.

5. The method of claim 1, wherein automatically performing the refresh operation on the first data object comprises automatically performing the refresh operation on the first data object in response to a number of invalidated rows of the first data object exceeding an invalidated row count threshold.

6. The method of claim 1, wherein automatically performing the refresh operation on the first data object comprises automatically performing the refresh operation on the first data object in response to a number of invalidated rows of the first data object exceeding a percentage threshold.

7. The method of claim 1, wherein automatically performing the refresh operation on the first data object comprises automatically performing the refresh operation on the first data object in response to a number of new rows within a block range of the first data object added to the particular data object after creation of the first data object exceeding a new row count threshold.

8. The method of claim 1, wherein automatically performing the refresh operation on the first data object comprises automatically creating a replacement data object for the first data object, the replacement data object containing a more current version of the first data than a version of the first data contained in the first data object, the first data in the replacement data object organized in the column-major format, and further comprising deleting the first data object after automatically creating the replacement data object.

9. The method of claim 1, wherein automatically performing the refresh operation on the first data object comprises automatically creating a replacement data object for the first data object using the first data included in the first data object and at least one of the particular data or a journal associated with the first data object, the journal including a record of each change to one or more portions of the first data after creation of the first data object, each change to the one or more portions of the first data mirroring each respective change to corresponding one or more portions of the particular data.

10. The method of claim 1, wherein automatically performing the refresh operation on the first data object comprises automatically creating a replacement data object for the first data object using the particular data or a journal associated with the first data object, the journal including a record of each change to one or more portions of the first data after creation of the first data object, each change to the one or more portions of the first data mirroring each respective change to corresponding one or more portions of the particular data.

11. The method of claim 1, wherein a record file is associated with the first data object and the second data object, the record file including a record of changes to one or more portions of the first data after creation of the first data object and changes to one or more portions of the second data after creation of the second data object, the changes to the one or more portions of the first and second data mirroring each respective change to corresponding one or more portions of the first and second data in the particular data object.

12. The method of claim 1, wherein the refresh operation comprises one or more background processes of a database server having access to the particular data object, first data object, and second data object.

13. The method of claim 1, wherein the refresh criteria is satisfied relative to the first data object when a number of invalid rows of the first data object exceeds a threshold.

14. One or more non-transitory storage media storing instructions which, when executed by one or more processors, cause:
- maintaining a particular data object that contains particular data formatted different from column-major format, wherein the particular data includes first data and second data;
- maintaining a first data object that contains the first data organized in the column-major format;
- maintaining a second data object that contains the second data organized in the column-major format;
- in response to changes being committed to the first data in the particular data object, invalidating one or more rows of the first data object;
- in response to refresh criteria being satisfied relative to the first data object, automatically performing a refresh operation on the first data object independent of any refresh operation on the second data object;
- in response to changes being committed to the second data in the particular data object, invalidating one or more rows of the second data object; and
- in response to refresh criteria being satisfied relative to the second data object, automatically performing a refresh operation on the second data object independent of any refresh operation on the first data object.

15. The one or more non-transitory storage media of claim 14, wherein a single set of journal extents is used to maintain an indication of which rows are invalid for both the first data object and the second data object.

16. The one or more non-transitory storage media of claim 14, wherein maintaining the particular data object comprises maintaining the particular data object formatted in row-major format in a persistent storage, and wherein maintaining the first data object comprises maintaining the first data object in a volatile memory.

17. The one or more non-transitory storage media of claim 14, wherein the particular data object comprises at least one of a table, a table partition, a table sub-partition, one or more segments, a set of segments, one or more extents, a set of extents, a set of block of data, one or more columns of a table, one or more on-disk extents, or a set of data.

18. The one or more non-transitory storage media of claim 14, wherein automatically performing the refresh operation on the first data object comprises automatically performing the refresh operation on the first data object in response to a number of invalidated rows of the first data object exceeding an invalidated row count threshold.

19. The one or more non-transitory storage media of claim 14, wherein automatically performing the refresh operation on the first data object comprises automatically performing the refresh operation on the first data object in response to a number of invalidated rows of the first data object exceeding a percentage threshold.

20. The one or more non-transitory storage media of claim 14, wherein automatically performing the refresh operation on the first data object comprises automatically performing the refresh operation on the first data object in response to a number of new rows within a block range of the first data object added to the particular data object after creation of the first data object exceeding a new row count threshold.

21. The one or more non-transitory storage media of claim 14, wherein automatically performing the refresh operation on the first data object comprises automatically creating a replacement data object for the first data object, the replacement data object containing a more current version of the first data than a version of the first data contained in the first data object, the first data in the replacement data object organized in the column-major format, and further comprising deleting the first data object after automatically creating the replacement data object.

22. The one or more non-transitory storage media of claim 14, wherein automatically performing the refresh operation on the first data object comprises automatically creating a replacement data object for the first data object using the first data included in the first data object and at least one of the particular data or a journal associated with the first data object, the journal including a record of each change to one or more portions of the first data after creation of the first data object, each change to the one or more portions of the first data mirroring each respective change to corresponding one or more portions of the particular data.

23. The one or more non-transitory storage media of claim 14, wherein automatically performing the refresh operation on the first data object comprises automatically creating a replacement data object for the first data object using the particular data or a journal associated with the first data object, the journal including a record of each change to one or more portions of the first data after creation of the first data object, each change to the one or more portions of the first data mirroring each respective change to corresponding one or more portions of the particular data.

24. The one or more non-transitory storage media of claim 14, wherein a record file is associated with the first data object and the second data object, the record file including a record of changes to one or more portions of the first data after creation of the first data object and changes to one or more portions of the second data after creation of the second data object, the changes to the one or more portions of the first and second data mirroring each respective change to corresponding one or more portions of the first and second data in the particular data object.

25. The one or more non-transitory storage media of claim 14, wherein the refresh operation comprises one or more background processes of a database server having access to the particular data object, first data object, and second data object.

26. The one or more non-transitory storage media of claim 14, wherein the refresh criteria is satisfied relative to the first data object when a number of invalid rows of the first data object exceeds a threshold.

* * * * *

UNITED STATES PATENT AND TRADEMARK OFFICE
CERTIFICATE OF CORRECTION

PATENT NO. : 9,606,921 B2  
APPLICATION NO. : 14/337045  
DATED : March 28, 2017  
INVENTOR(S) : Kamp et al.

Page 1 of 1

It is certified that error appears in the above-identified patent and that said Letters Patent is hereby corrected as shown below:

In the Specification

In Column 33, Line 15, delete "IMUCs" and insert -- IMCUs --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*